United States Patent [19]

Peterson et al.

[11] Patent Number: 5,632,041
[45] Date of Patent: May 20, 1997

[54] SEQUENCE INFORMATION SIGNAL PROCESSOR FOR LOCAL AND GLOBAL STRING COMPARISONS

[75] Inventors: John C. Peterson, Alta Loma; Edward T. Chow, San Dimas; Michael S. Waterman, Culver City; Timothy J. Hunkapillar, Pasadena, all of Calif.

[73] Assignee: California Institute of Technology, Pasadena, Calif.

[21] Appl. No.: 154,633

[22] Filed: Nov. 18, 1993

Related U.S. Application Data

[63] Continuation of Ser. No. 518,562, May 2, 1990, abandoned.
[51] Int. Cl.$^6$ .................................................. G06F 19/00
[52] U.S. Cl. ................... 395/800; 395/898; 364/DIG. 2; 364/931.48; 364/940.66; 364/947.2
[58] Field of Search .................................. 395/375, 800, 395/425, 24, 2.48, 21

[56] References Cited

U.S. PATENT DOCUMENTS

| | | | |
|---|---|---|---|
| 4,698,751 | 10/1987 | Parvin | 395/800 |
| 4,760,523 | 7/1988 | Yu et al. | 395/800 |
| 4,845,610 | 7/1989 | Parvin | 395/800 |
| 5,129,077 | 7/1992 | Hillis | 395/500 |

OTHER PUBLICATIONS

Maizel; "Supercomputing in Molecular Biology: Applications to Sequence Analysis"; Dec. 1988.
Lipton et al "Computational Approaches to Discovering Semantics in Molecular Biology"; Jul. 1989.
"The Bio Scan Project, An interdisiplinary Approach to Biosequence Analysis" White et al, Oct. 1989.
"A New Algorithum for Best Subsequence Alignment with Application to tRNA-rRNA Comparisons" Waterman et al 1987.
"Bio Scan: A VLSI-Based System for Bio Sequence Analysis", White et al. 1991.

"The Design of Special-Purpose VLSI Chips" Foster et al, 1980.
"On High-Speed Computing with a Programmable Linear Array", Lee et al, 1988.
"Why Systolic Architecture" Kung 1982.
"A Systolic Array for Rapid String Compariser" Lipton, 1985.
"Identification of Common Molecular Subsequences". Waterman and Smith.

*Primary Examiner*—Larry D. Donaghue
*Attorney, Agent, or Firm*—Fish & Richardson P.C.

[57] ABSTRACT

A sequence information signal processing integrated circuit chip designed to perform high speed calculation of a dynamic programming algorithm based upon the algorithm defined by Waterman and Smith. The signal processing chip of the present invention is designed to be a building block of a linear systolic array, the performance of which can be increased by connecting additional sequence information signal processing chips to the array. The chip provides a high speed, low cost linear array processor that can locate highly similar global sequences or segments thereof such as contiguous subsequences from two different DNA or protein sequences. The chip is implemented in a preferred embodiment using CMOS VLSI technology to provide the equivalent of about 400,000 transistors or 100,000 gates. Each chip provides 16 processing elements, and is designed to provide 16 bit, two's compliment operation for maximum score precision of between −32,768 and +32,767. It is designed to provide a comparison between sequences as long as 4,194, 304 elements without external software and between sequences of unlimited numbers of elements with the aid of external software.

Each sequence can be assigned different deletion and insertion weight functions. Each processor is provided with a similarity measure device which is independently variable. Thus, each processor can contribute to maximum value score calculation using a different similarity measure.

48 Claims, 18 Drawing Sheets

SEQUENCE INFORMATION SIGNAL PROCESSOR FOR LOCAL AND GLOBAL STRING COMPARISONS

The invention described herein was made in the performance of work under the following contracts: NASA contract NAS7-918; DOE contract DEFG03-88er60683; NSF contracts DIR-8809710 and DMS-8815106; and NIH contract GM 36230, and is subject to the provisions of Public Law 96-517 (35 USC 202) in which the Contractors have elected to retain title.

This is a continuation of copending application(s) Ser. No. 07/518,562 filed on May 2, 1990, now abandoned.

TECHNICAL FIELD

The present invention relates generally to an integrated circuit developed primarily in support of the human genome effort which is a molecular genetic analysis for mapping and sequencing the human genome. The present invention relates more specifically to an integrated circuit co-processor which may be used for carrying out an algorithm for identifying maximally similar sequences or subsequences and for locating highly similar segments of such sequences or subsequences.

BACKGROUND ART

Release 63.0 of the national nucleic acid data base, Genbank, contains over forty million nucleotides representing about thirty-three thousand separate entries. Similarly, the current protein information resource (PIR) has close to six thousand entries with over one and one-half million amino acids. These data reflect primarily the efforts of the molecular biology community over the last decade. The rate at which new data are being added to this total demonstrates that the available computing resources are already inadequate for thorough and timely analysis of the data. Recently, an international commitment has been made to map and sequence the entire human genome in the next 10 to 20 years. Such a program will generate at least 3.4 billion nucleotides of final data and maybe ten times that amount of raw sequencing data. This constitutes about three orders of magnitude more data than has been collected to date. In addition, the sequences from other animal and plant genomes will also accumulate. In the near term, the 40 million nucleotides currently available and already proving burdensome, will become trivial by comparison to the total. Novel computer resources must be developed if these data are to be adequately understood and their unique potential for enhancing our understanding of human genetics and diseases are to be realized.

A required adjunct to any program designed to characterize the human genome is the development of computer hardware and software systems capable of maintaining and analyzing the vast amounts of information that will be generated. This information will consist of both nucleotide and amino acid sequence data as well as extensive annotation necessary to provide a biological context for these data. It is critical for the complete and timely analysis of new sequence data, that they be thoroughly compared to the published data contained in the national data libraries. This analysis is important for determining and defining the functional and evolutionary relationships between sequences. Significantly, such sequence comparison is also critical to the task of constructing the complete genome sequence from millions of partially overlapping fragments, the so-called melding process. The computational load of this melding process will grow not only at the national level of coordinating the efforts of many researchers, but also at the level of individual laboratories that must deal with the increasing load of raw data generated by the development of automated sequencing technologies.

The ability of individual investigators to analyze their own data is limited by the power of the computers they have available, as well as the limited software tools capable of dealing with the entire sequence library. The amount of total sequence data generated to date is still less than 50 million character equivalents. However, this amount of data already taxes the ability of currently available algorithms and general use computers to conduct the needed comparative analysis of new data to the collected total. The data libraries have been doubling in size every year. The program that is envisioned to characterize complete genomes, will soon cause the data libraries to increase exponentially. Such programs will also change the basic nature of the collected data and consequently the requirements for effective tools for its analysis.

In the latest Genbank release, the average length of an individual entry can span over one million bases. Many of the current methods of analyzing this data are based on the notion that each entry represents a discrete genetic element. However, this scenario does not adequately represent the more diffuse and complex organization of a eukaryotic genome, where the coding and regulatory elements of a simple gene can span more than one million bases. More complex loci, such as those coding for the rearranging receptors of the immune system, can span over one million bases and include hundreds or thousands of identifiably related elements. As more and larger sequencing efforts are undertaken, the complexity of information contained in single entries will require a novel set of maintenance and analytical tools.

The human beta globin locus is a good example. Its entry in Genbank is over 73 thousand bases long and has been constructed from over 70 overlapping contributions. This single entry contains the coding and regulatory information for at least 4 genes and 1 pseudogene. The repetitive nature of much of the genome will also severely complicate the alignment and melding problems. With megabase sequencing projects, the current concept of data entry will become obsolete. Not only will faster algorithms to compare sequences be needed as the amount of data increases, but these new tools will also have to be designed to better deal with longer strings of data that more directly reflect true genomic organization. Accordingly, novel schemes to handle and define these data and the biological information associated with them must be developed if this resource is to be useful to the scientific community.

Of the many pressing and analytical needs concerning the current sequence data libraries, as well as the genome project, initially the most significant is the ability to survey the existing collection of data for sequences related to the new data. In its simplest form, this need is illustrated by searching the collection of gene or protein sequences for any that are "similar" to a discrete piece of new data. The comparative analyses possible between related sequences are critical for completely understanding the structural, functional and evolutionary characteristics of any sequence. Furthermore, in the case where large portions of the human genome are known, it will also be necessary to have the ability to find the precise genetic location of physiological markers in those cases where there may be only limited CDNA or protein sequence data available.

Such searches are complicated by the fact that related sequences may be quite divergent. This means that it is essential to define some measure of similarity between pairs of sequences that can then be tested statistically. The explicit series of minimal evolutionary events (substitutions, deletions, insertions) between two sequences must be determined; i.e., the sequences must be aligned. Traditionally, the most common method of alignment has been by eye, relying on the researcher's ability to recognize conserved patterns. This method can be rapid and effective when the sequence distance is relatively small and/or the researcher has a priori information about the probable nature of the alignment. For example, many new members of the immunoglobulin gene superfamily have been identified and aligned to other members on the basis of a very limited, but well-defined set of conserved features. However, it is certainly no longer possible for any investigator to reliably compare a novel sequence against a significant portion of the existent data base.

It is possible in theory to generate every possible combination of genetic events between two sequences, score each one and discover the most similar. This is in practice, impossible for all but the shortest sequences however, as the combinations increase exponentially with the length of the sequences. Some investigators have implemented rule-based methods by which, given a reasonable starting alignment point, gaps and insertions are included according to a very restricted set of possibilities. These methods can be relatively rapid, but, like manual alignment, are non-rigorous methods as they cannot predictably guarantee that the results represent the optimal minimum distance, that is, the minimum evolutionary distance between two sequences or the series of events that provides the smallest weighted sum required to transform one sequence into the other.

When the assumption is that two sequences are generally similar along their entire length, the alignment process is considered to be global in nature. However, an alignment proceeding from this premise can fail to recognize more limited regions of similarity between two otherwise unrelated sequences. What is required then is the ability to find all regions of local alignment. For example, if an investigator has a new sequence related to a human beta globin gene, such as one from another species, the need is to be able to find the local alignment of that more limited sequence to some particular portion of the 73 thousand base of the known beta globin locus. The same concerns are manifest in the melding problem. By definition, most overlapping sequences will only share a limited region of identity, illustrating a local alignment problem.

In 1970, S. B. Needleman and C. D. Wunsch authored a paper entitled "A General Method Applicable To The Search For Similarities In The Amino Acid Sequence Of Two Proteins", which was published in the Journal of Molecular Biology, Volume 48, Page 444. Their paper has had a great deal of influence in biological sequence alignment. Its particular advantage is that an explicit criterion for optimality of alignment is stated and an efficient method of solution is given. Insertions, deletions and mismatches were allowed in the alignments. The method of Needleman and Wunsch fit into a broad class of algorithms, commonly referred to as dynamic programming. The general category of dynamic programming alignment of two sequences is discussed at length in a text entitled "Mathematical Methods for DNA Sequences" and particularly Chapter 3 thereof, entitled "Sequence Alignments" written by Michael S. Waterman, of the University of Southern California, a co-inventor of the present invention.

In 1980, Dr. Waterman, then with the Los Alamos Scientific Laboratory, collaborated with T. F. Smith, then a Professor at Northern Michigan. University, in publishing a letter entitled "Identification of Common Molecular Subsequences" which appeared in the Journal of Molecular Biology, Volume 147, pages 195–197, 1981. In this letter, Waterman and Smith defined a new algorithm, the intention of which was to find a pair of segments, one from each of two long sequences, such that there was no other pair of segments with greater similarity (or "hornology"). The algorithm produced a similarity measure which allowed for arbitrary length, deletions and insertions.

In a more recent publication, entitled "A New Algorithm for Best Subsequence Alignments With Application to tRNA-rRNA Comparisons", Waterman and Mark Eggert, in the Journal of Molecular Biology, Volume 197, pages 723–728, (1987), describe the efficiency of the algorithm of Smith and Waterman for identification of maximally similar subsequences. The article describes the use of the algorithm in which alignments of interest are produced first for the best alignment and then making small modifications to the matrix for producing non-intersecting subsequent alignments. The algorithm is applied to comparisons of tRNA-rRNA sequences from *escherichia coli*. A statistical analysis therein shows results which differ substantially from the results of an earlier analysis by others and furthermore, that the algorithm is much simpler and more efficient than those previously in use.

The need for low cost, high speed data sequence comparisons cannot be met even with current supercomputers because of existing data base size. There is therefore an existing need to provide an electronic circuit device for carrying out subsequence alignments of molecular sequences or global alignment thereof and more specifically for a sequence information signal processor designed to carry out a dynamic programming algorithm which is both effective and efficient in identifying subsequence or global alignments of molecular information.

SUMMARY OF THE INVENTION

The present invention comprises a sequence information signal processing integrated circuit chip designed to perform high speed calculation of a dynamic programming algorithm based upon Waterman and Smith. The signal processing chip of the present invention is designed to be a building block of a linear systolic array, the performance of which can be increased by connecting additional sequence information signal processing chips to the array. The chip provides a high speed, low cost linear array processor that can locate highly similar segments or contiguous subsequences from any two data character streams (sequences) such as different DNA or protein sequences. The chip is implemented in a preferred embodiment using CMOS VLSI technology to provide the equivalent of about 400,000 transistors or 100,000 gates. Each chip provides 16 processing elements, operating at a 12.5 MHz clock frequency. The chip is designed to provide 16 bit, two's compliment operation for maximum score precision of between −32,768 and +32,767. It is designed to provide a comparison between sequences as long as 4,194, 304 elements without external software and between sequences of unlimited numbers of elements with the aid of external software.

The sequence information signal processor chip of the present invention permits local and global similarity searches, that is subsequence and full sequence alignment. It provides user definable gaps/insertion penalties; user definable similarity table contents; user definable threshold values for score reporting; user definable character set of up to 128 characters; user definable sequence control characters for streamline data base processing; variable block size for low or high resolution similarity searches; makes possible unlimited sequence length and numbers of blocks; on-chip block maximum score calculation; and on-chip maximum score buffer to relieve control processor data collection. It provides linear speedup by being configured for cascading more such chips and it provides threshold control with boundary score reset. The chip also provides for programmable data base operation support; block maximum value and location calculation and buffering; user-definable query threshold and preload threshold and built-in self test and fault bypass.

It will be seen hereinafter that each of sixteen processor elements on a sequence information signal processing integrated circuit chip of the present invention, provides the circuitry to compare the sequence characters of a matrix H, based upon a novel modification of the Smith and Waterman Algorithm for two sequences. Circuitry is also provided for defining the degrees of similarity of two sequences so that different linear deletion functions can be defined for each of the two sequences and different similarity weights can be defined for each character of the query sequence.

In its preferred embodiment, the chip of the present invention is configured as a 208 pin, CMOS VLSI integrated circuit device.

OBJECTS OF THE INVENTION

It is therefore a principal object of the present invention to provide a sequence information signal processing system on a single integrated circuit chip for performing a best subsequence and global alignments algorithm at high speed, at low cost and with optimum parameter control.

It is an additional object of the present invention to provide an integrated circuit chip having highly integrated VLSI technology for ascertaining the similarity between two segments of two different DNA or protein sequences by performing a best subsequence alignment algorithm.

It is still an additional object of the present invention to provide an integrated circuit chip having a plurality of processors thereon, each such processor being designed to carry out an algorithm for providing scoring of the relative alignments of sequence segments for such uses as biological information signal processing, speech recognition, cryptology, geological strata analysis, handwriting recognition, large text database searches and other applications which require the comparison of multiple sequences of data.

BRIEF DESCRIPTION OF THE DRAWINGS

The aforementioned objects and advantages, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

The information signal processor integrated circuit chip of the present invention is designed to compare two sequences, such as two molecular sequences, and to determine their similarity by ascertaining the best score of any alignment between such sequences. A preferred embodiment of the invention illustrated herein is designed to perform this sequence comparison by carrying out the previously identified Smith and Waterman algorithm. Accordingly, the method and apparatus of the present invention may be best understood by first understanding the algorithm on which it is based and which comprises the following:

For two sequences $A=a_1a_2 \ldots a_n$ and $B=b_1b_2 \ldots b_m$, the best (largest) score from aligning A and B is $S(A,B)$.

$H_{ij}$ is defined as the best score of any alignment ending at $a_i$ and $b_j$ or ). So, $$H_{ij}=\max(0; S(a_x a_{x+1} \ldots a_i, b_y b_{y+1} \ldots b_j); 1<=x<=i, 1<=y<=j).$$

The similarity measure between sequence letters a and b is $S(a,b)$ where, $s(a,b)>0$ if $a=b$ $s(a,b)<0$ for at least some cases of a not equal to b.

The similarity algorithm is started with:

$$H_{i,0}=H_{0,j}=0, 1<=i<=i<=n, 1<=j<=m.$$

Then:

$$H_{i,j}=\max\{0, H_{i-1,j-1}+s(a_i,b_j), E_{i,j}, F_{i,j}\}$$

where:

$$E_{i,j}=\max\{H_{i,j-1}-(u_E+V_E), E_{i,j-1}-V_E\}$$

$$F_{i,j}=\max\{H_{i-1,j}-(u_F+V_F), F_{i-1,j}-V_F\}$$

From the above, it will be seen that each processor for determining the best score $H_{i,j}$ of an alignment ending at $a_i$ and $b_j$ must provide parameters for the calculation of $H_{i+1,j}$; $H_{i,j+1}$; and $H_{i+1,j+1}$. This requirement for generating parameters for subsequent best score calculation processes may be better understood by reference to FIG. 1, which for purposes of example, illustrates a four-by-four matrix of calculations for n=4 and m=4. It will be seen in FIG. 1 that each alignment comparison process is represented by a circle having within it elements of the two sequences, A and B, at which the respective alignments are being scored. It will also be seen in FIG. 1, that parameters are passed either from left to right or from top to bottom or diagonally from upper left to lower right from each alignment process circle to the others in the matrix in order to carry out the algorithm of the present invention. Thus for example, it will be seen in FIG. 1, that the best score for the alignment ending at $a_2$ and $b_2$, receives the parameter $H_{1,1}$ from $a_1,b_1$ comparison process; receives $H_{1,2}$ and $F_{1,2}$ from the $a_1,b_2$ comparison process; and receives the $H_{2,1}$ and $E_{2,1}$ parameters from the $a_2,b_1$ process. All of these parameters are, in accordance with the Waterman and Smith algorithm, required to generate $H_{2,2}$ which is defined as the best score of the alignment of the A and B sequences ending at $a_2$ and $b_2$.

Figure 1:
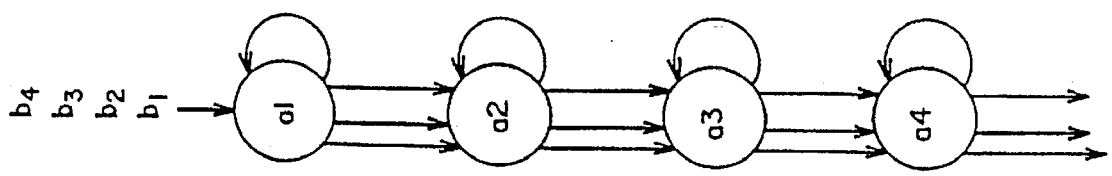
FIG. 1 is a graphical illustration of the matrix elements of the algorithm of the present invention and illustrating a projection technique for reducing the number of real time processors for carrying out the algorithm.
Figure 1:
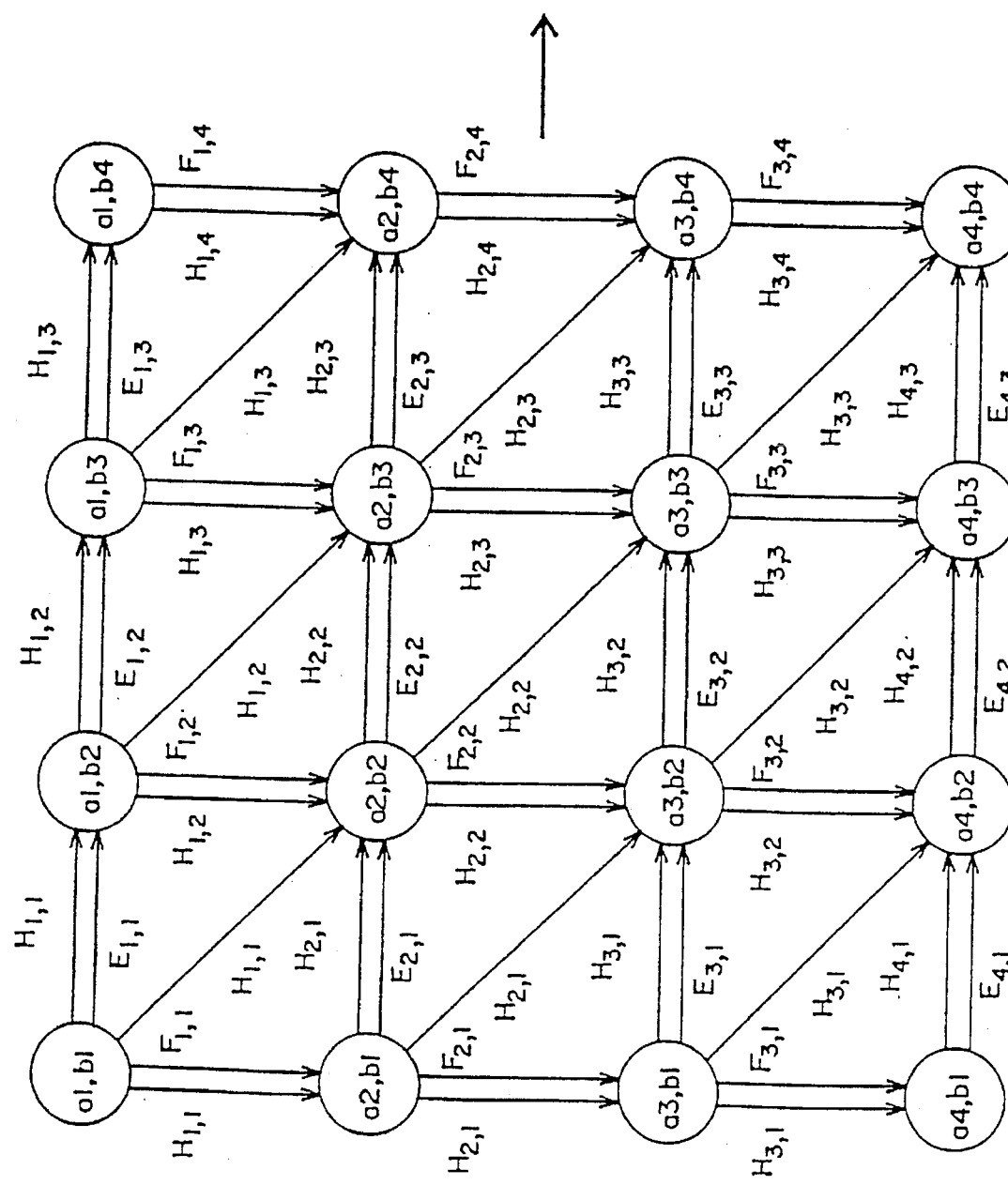

It will also be seen in FIG. 1, that as a result of the computation carried out by the process at $a_2,b_2$ parameters $H_{2,2}$, $E_{2,2}$ and $F_{2,2}$, all resulting from the best score alignment computation at $a_2,b_2$ are transferred as required to each of the three subsequent comparisons $a_2,b_3,a_3,b_2$ and $a_3,b_3$. Based upon the need for the generation of parameters for best score alignment comparisons for previous values of $a_i$ and $b_j$ in the sequences of A and B, it will be seen that not all of the best score alignment computation processes can be carried out simultaneously. Thus for example,. best score computation for $a_1,b_2$ and $a_2,b_1$ must await the results of the computation process for $a_2,b_2$. Similarly, the computation process for $a_1$, $b_1$ must await the results of the computation processes for $a_1,b_1$ $a_2,b_1$ and $a_1,b_2$. Consequently, it would be entirely inefficient to perform the algorithm depicted in FIG. 1 for an exemplary four-by-four matrix with a separate processor for each combination of $a_i$ and $b_j$. On the contrary, it would be most efficient to use only that number of processors which equals to the maximum number of processors being used at any one time, based upon the sequence of parameter generation required, as shown in FIG. 1. Accordingly, as seen in the right most portion of FIG. 1, the Smith and Waterman algorithm for a four-by-four matrix, that is for A=$a_1,a_2,a_3,a_4$ and B=$b_1,b_2,b_3$ and $b_4$; may be carried out by four computation processors with appropriate interconnections to assure the transfer of necessary parameters from processor to processor.

In the language of VLSI array processor design, the left-most portion of FIG. 1 is referred to as a systolic parallel processor array and the right-most portion of FIG. 1 is referred to as a signal flow graph. The technique for mapping algorithms into systolic parallel processor arrays and the technique for projecting such graphs into signal flow graphs may be understood best by referring to the text entitled VLSI Array Processors by S. Y. Kung, published by the Signal and Image Processing Institute of the University of Southern California, Copyright 1986.

The signal flow graph of the right side of FIG. 1, illustrates that the systolic processor array graph on the left side may be horizontally projected into a signal flow configuration which requires only four processor elements to carry out the four-by-four matrix algorithm. For the example, as shown in FIG. 1, each such processor on the right-most portion of FIG. 1 is permanently associated with an element of the A sequence, namely $a_1,a_2,a_3,$ and $a_4$, respectively. On the other hand, the B sequence elements, namely, $b_1,b_2,b_3,$ and $b_4$, respectively, are sequentially applied in a serial manner through the elements so that the first alignment best score computation occurs at $a_1,b_1$.

Figure 2:
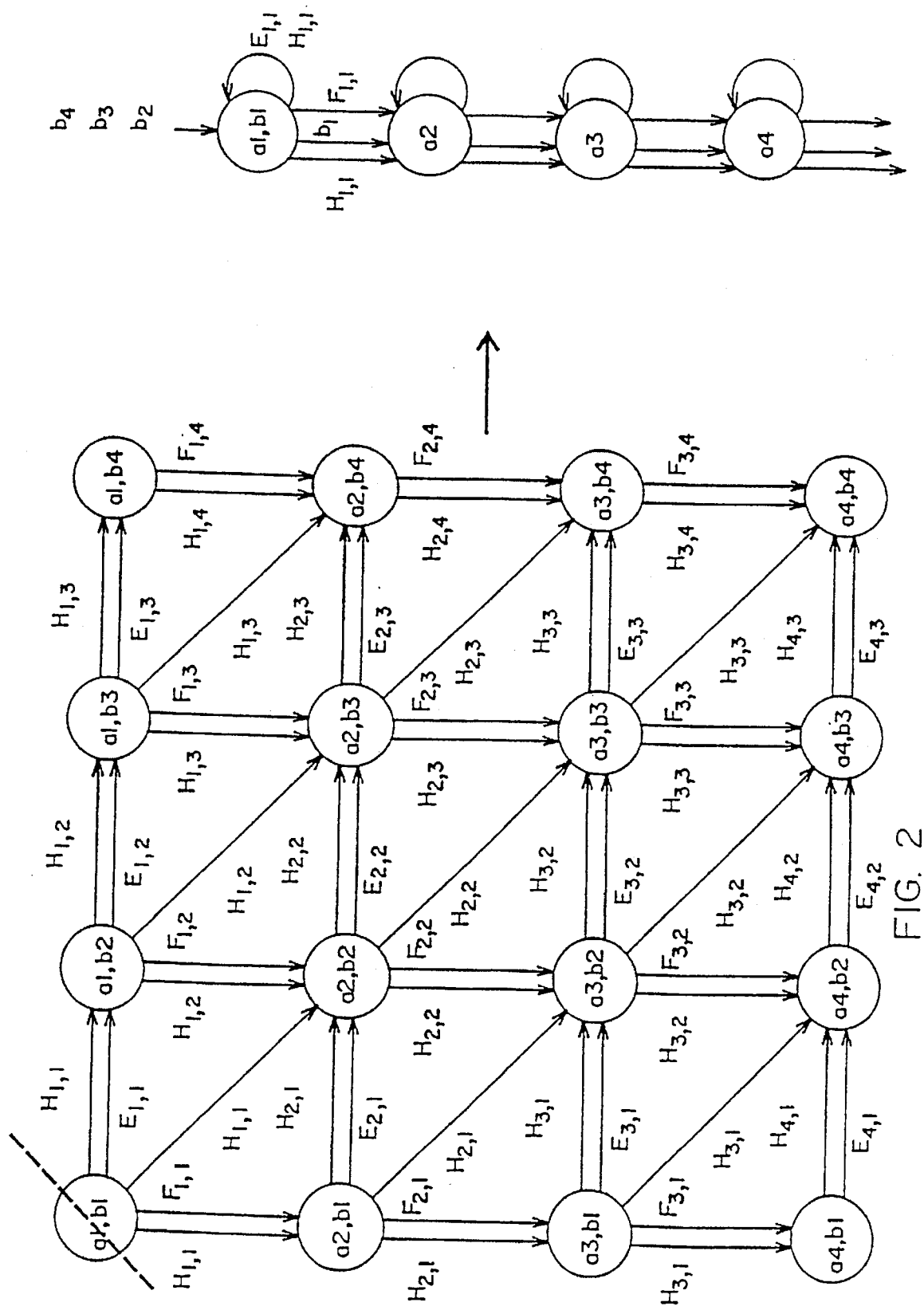
FIGS. 2–9 illustrate sequential snapshot representations of the algorithm steps of the present invention in a four-by-four exemplary matrix.

The lines with arrow heads associated with each of the elements in the right-most portion Of FIG. 1, represent parameter values that are either transferred from element to element in series or are fed back and used in the same element for the next computation. More specifically, FIG. 2 represents a combined systolic array graph and horizontal projection graph at a "snapshot" in time at which the $a_1,b_1$ alignment computation is taking place as represented by the dashed line through the $a_1,b_1$ processor in the left portion of FIG. 2. The $b_1$ signal has been applied to the first processor to permit the computation of the score ending at $a_1,b_1$. The parameter values emanating from this first sequence computation are represented by the arrow head lines emanating from the first processor element shown therein at the right most portion of FIG. 2. As seen therein, $E_{1,1}$ and $H_{1,1}$ are both fed back into the $a_1$ element for the subsequent computation. In addition, the $H_{1,1}$ the $F_{1,1}$ and the $b_1$ signals are transferred to the next processor element with which a is permanently associated.

Figure 3:
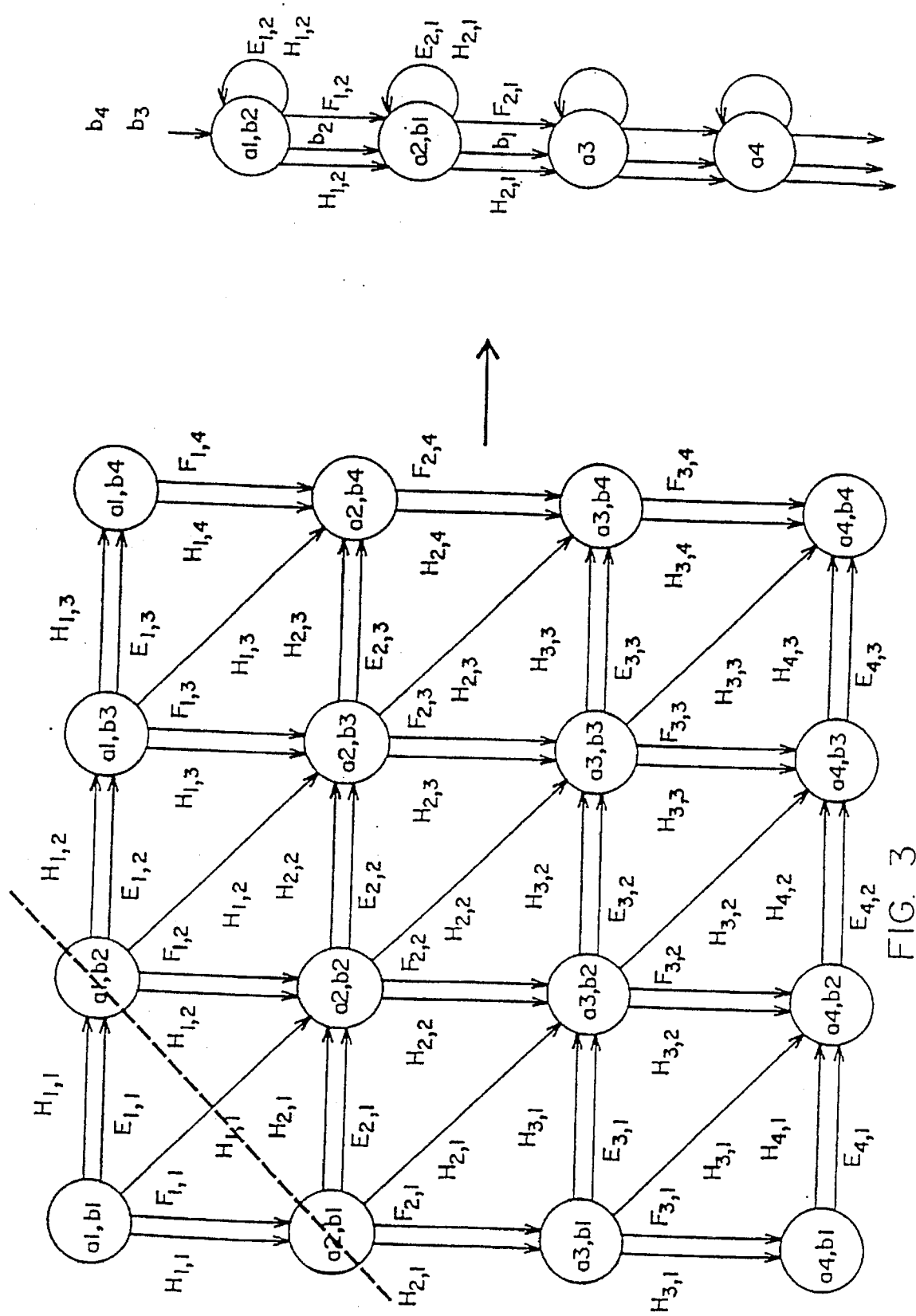
Figure 4:
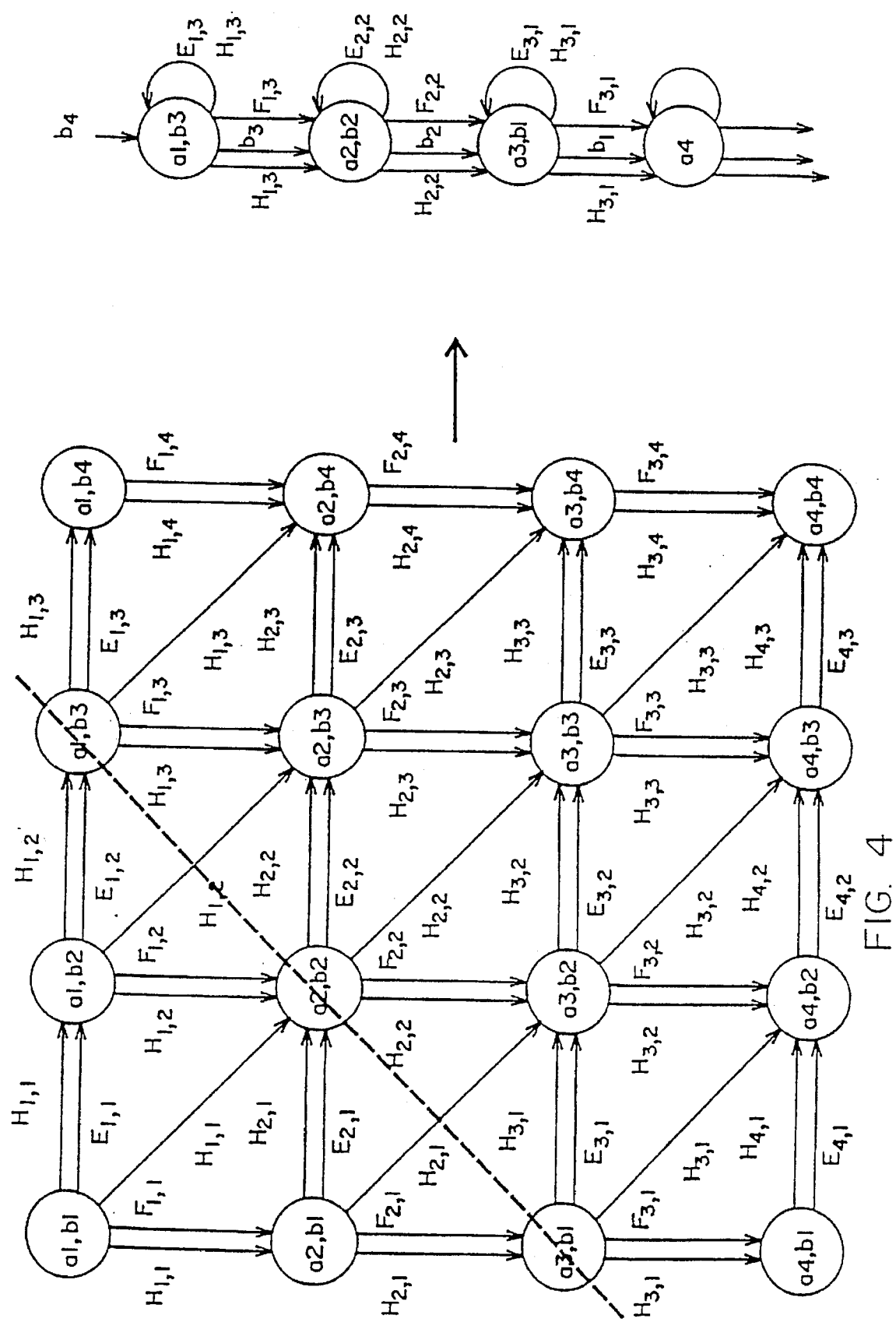
Figure 5:
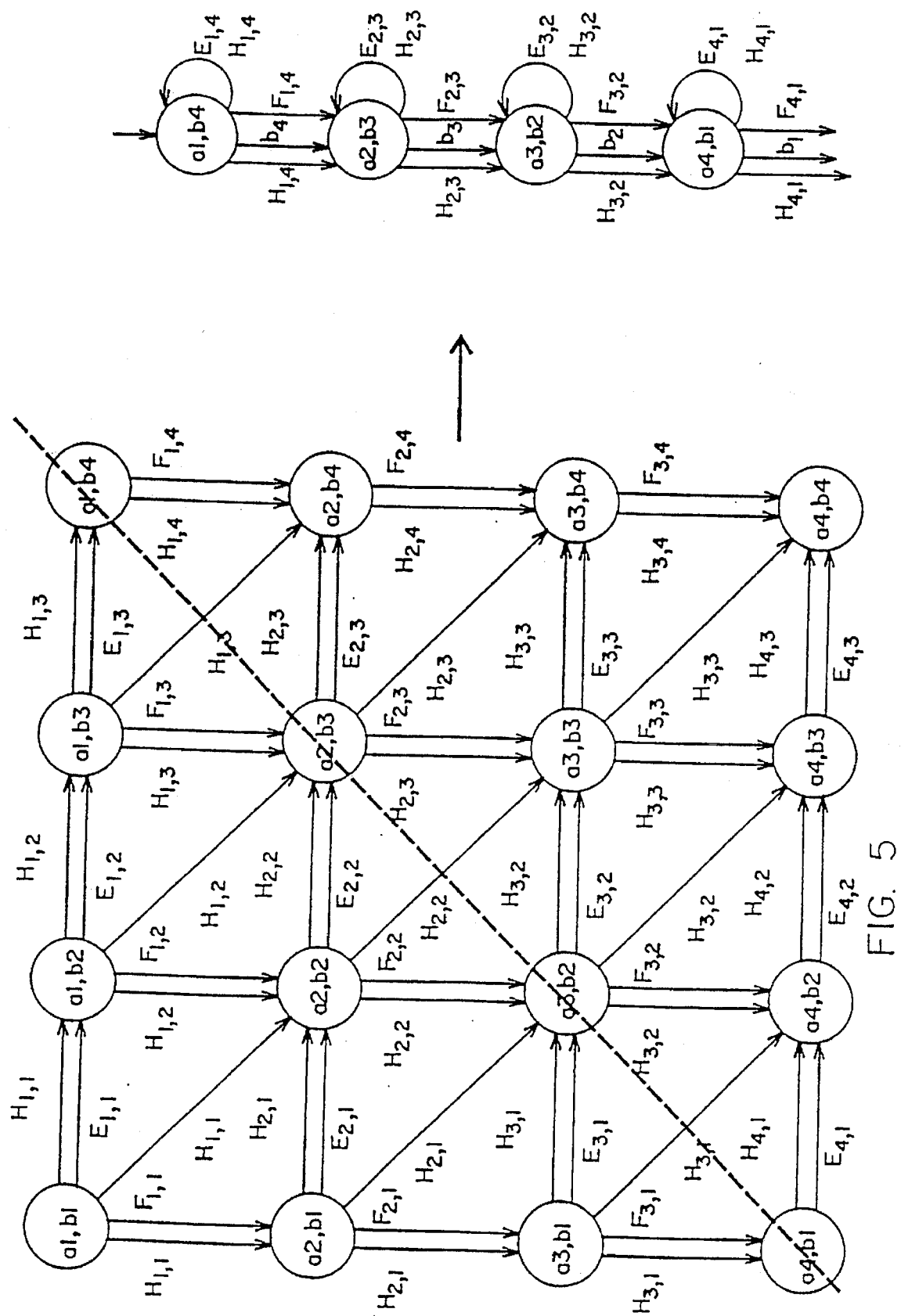
Figure 6:
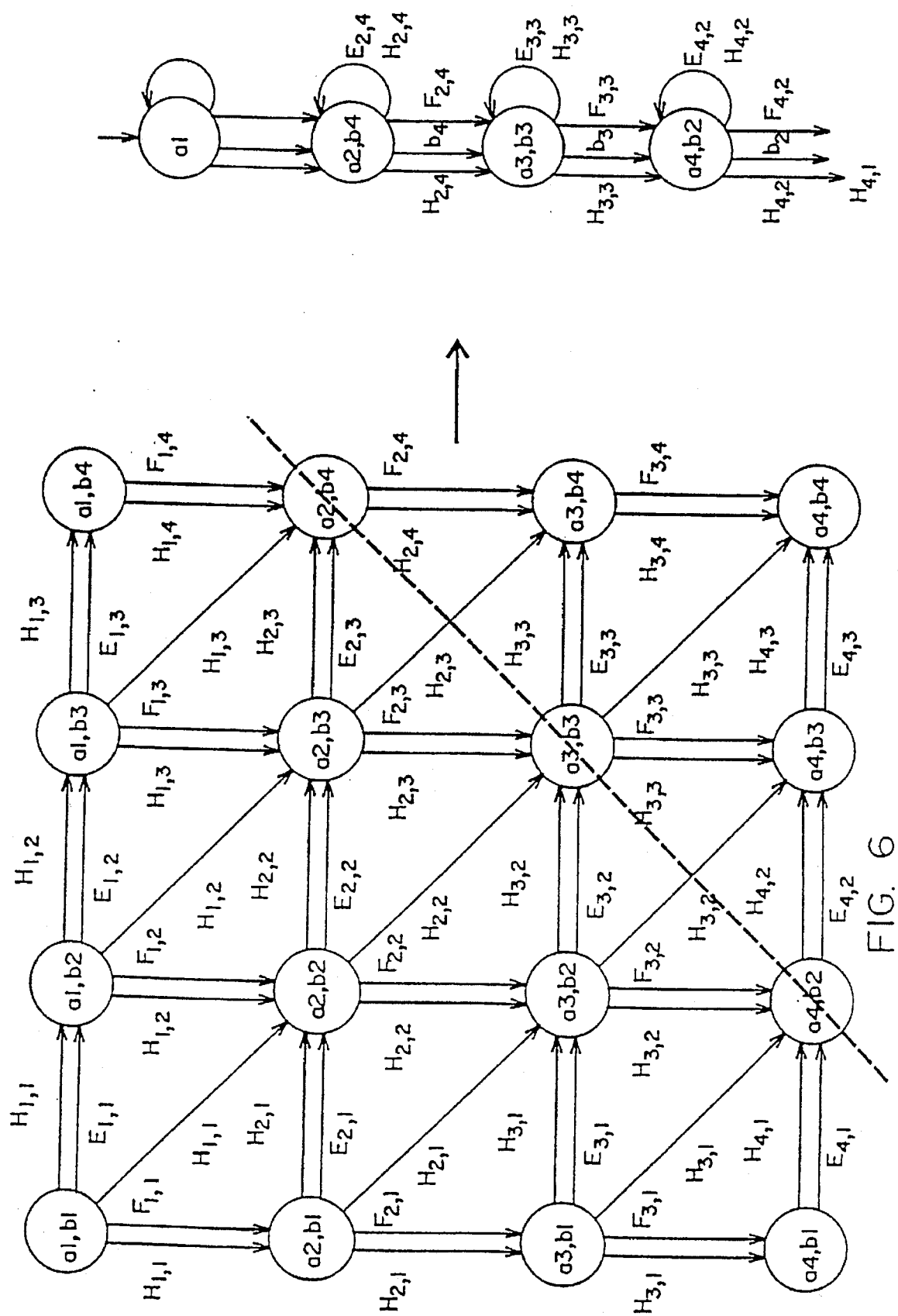
Figure 7:
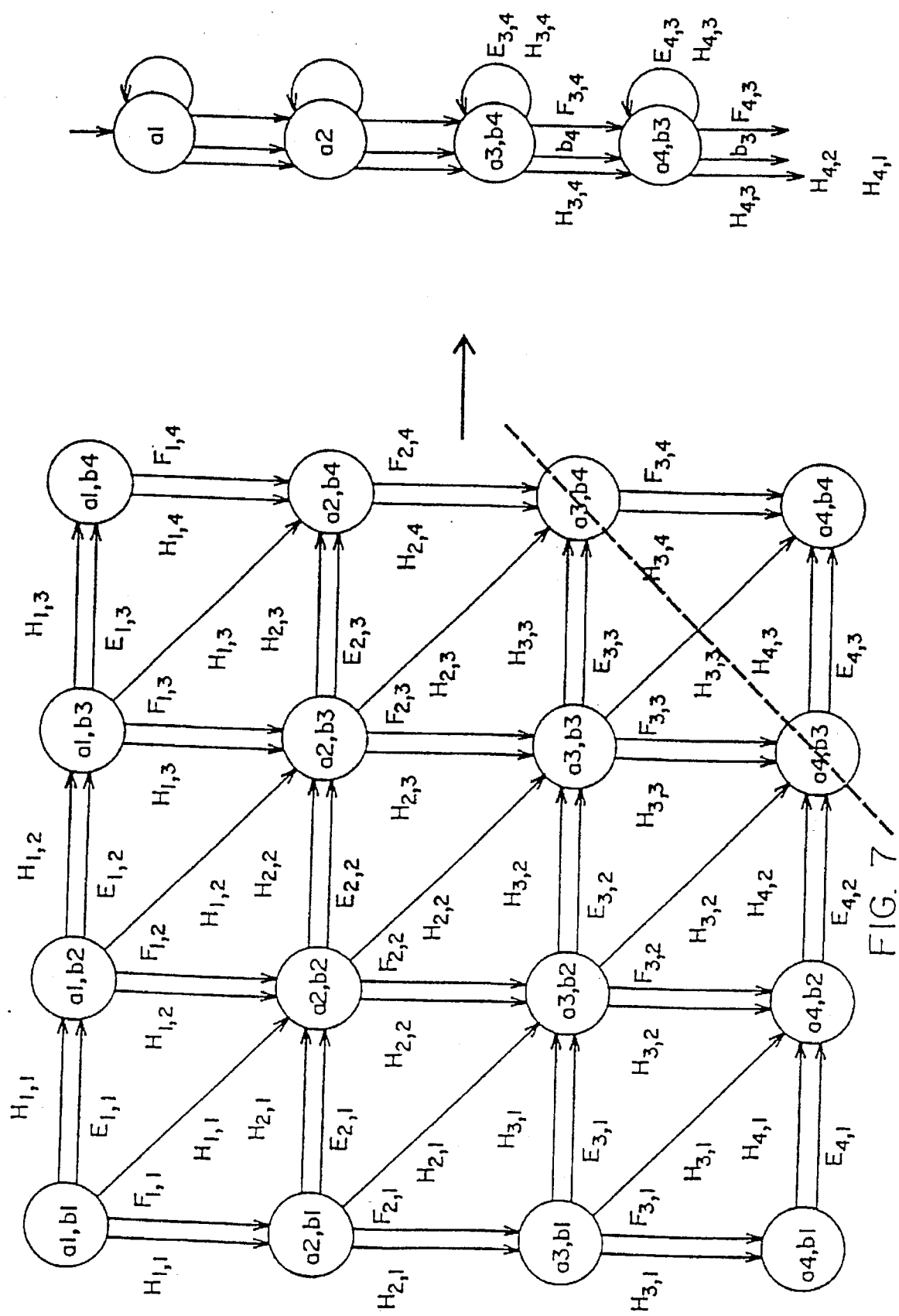
Figure 8:
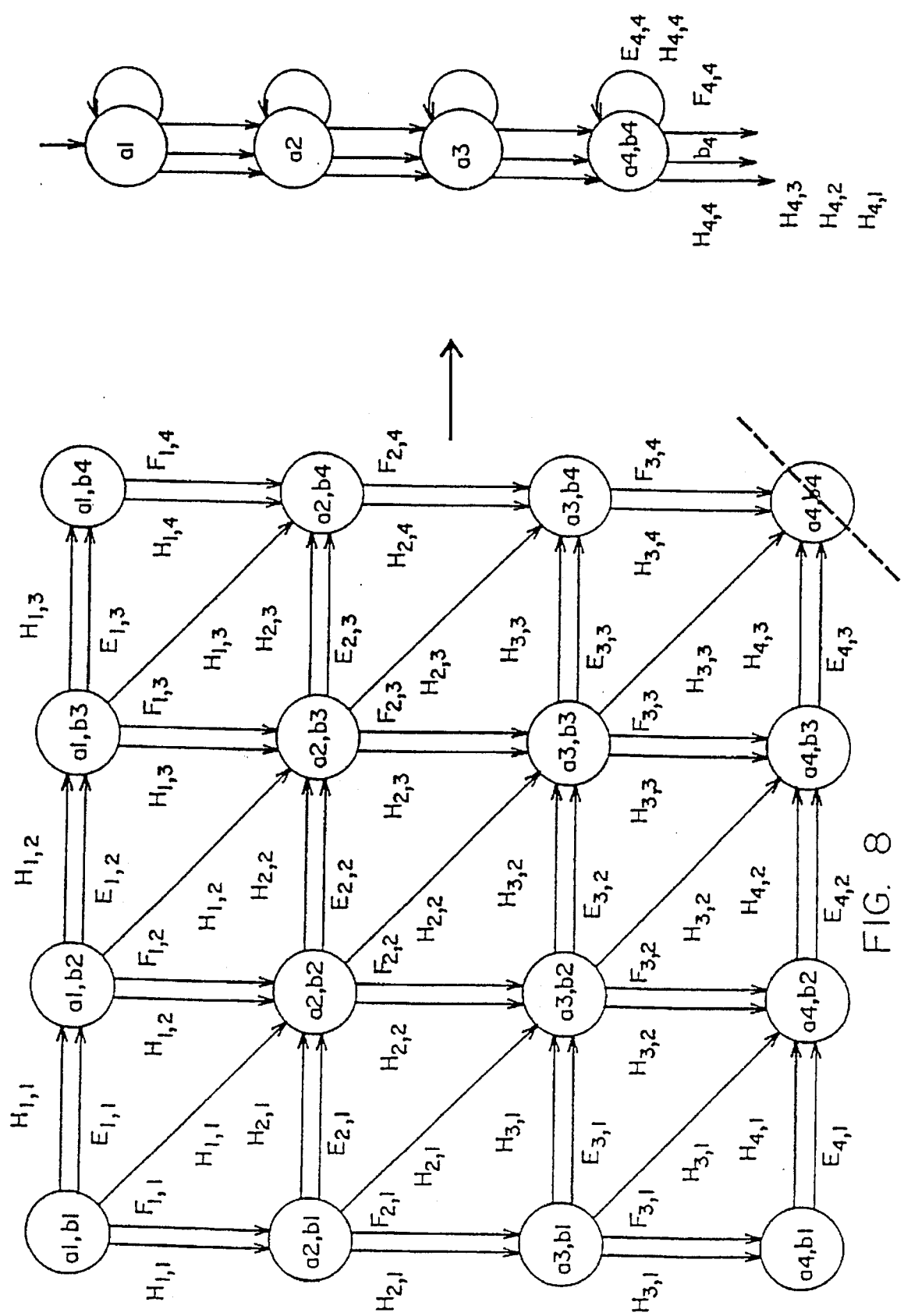

The next subsequent snapshot of sequence operation is shown in FIG. 3, and as illustrated by the dashed line in the left most portion of FIG. 3, this snapshot finds the top-most sequence processor in the right-most portion of FIG. 3, operating on the $a_1,b_2$ computation and the processor below the first operates on the $a_2,b_1$ computation. Each of these first two element processors generates appropriate parameter signals required by computations in the next snapshot period which is shown in FIG. 4, each element with a new value of $b_j$ entering the top-most element and the value of $b_j$ processed by the top most element being transferred to the next element along with the other required parameters for the algorithm.

This process continues, snapshot after snapshot, as represented by FIGS. 5, 6, 7 and 8. This example illustrates that the four-by-four matrix of processors for calculating the best score of any alignment between sequences A and B in the Smith and Waterman algorithm can be achieved with only four actual processors operating in an appropriate sequence. It, of course, requires the appropriate signals representing parameters required by the algorithm to be transferred from processor to processor as illustrated in snapshot to snapshot sequence of FIGS. 2 to 8.

Figure 9:
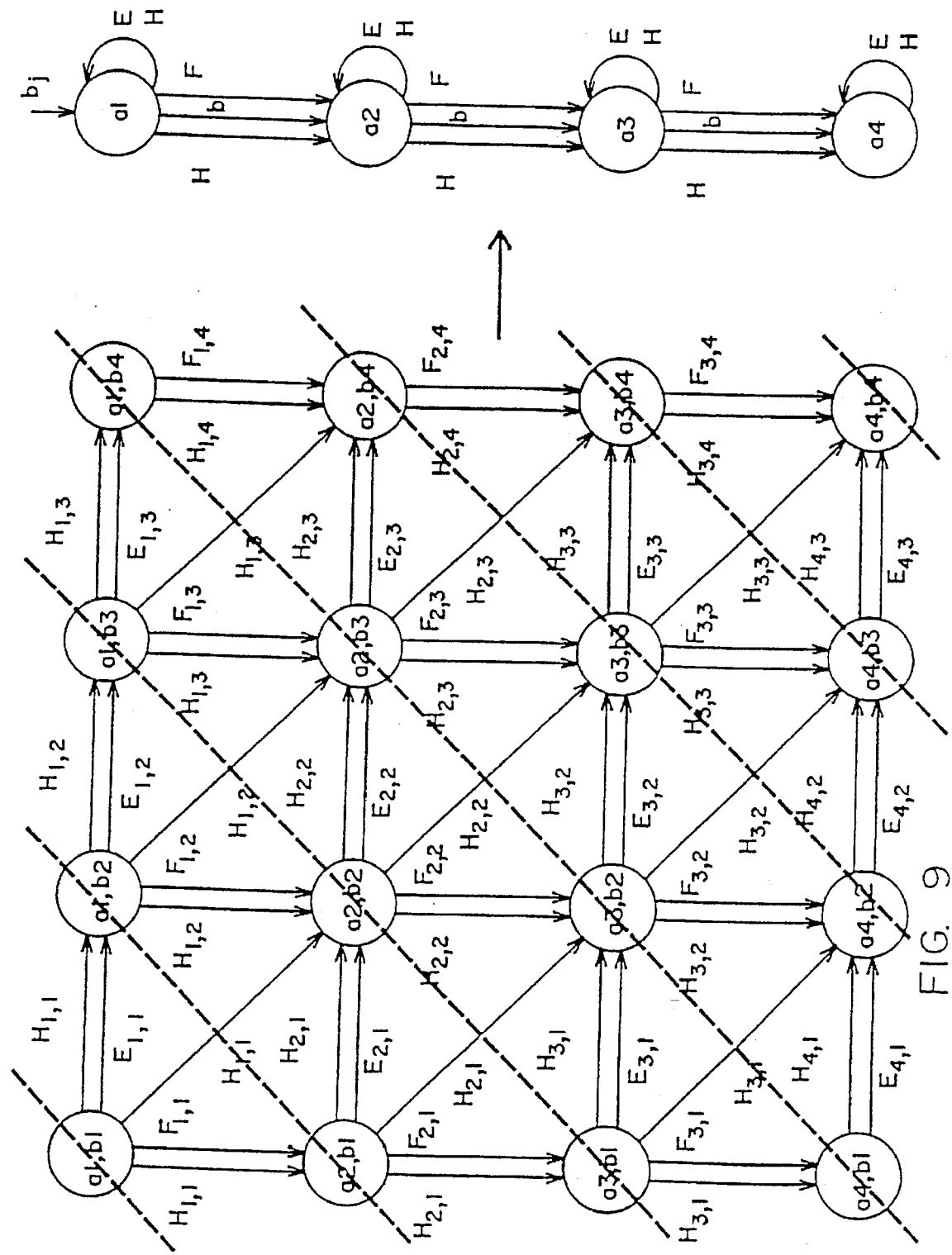

The signal flow through four processors represented by the right-most portion or signal flow graph portion of FIG. 9, may be used to carry out all the required steps of the algorithm for a four-by-four matrix in seven snapshots or clock periods represented by the seven dashed lines of the left-most portion or systolic processor array portion of FIG. 9. It will be understood however, that the four-by-four matrix of processors of FIGS. 2–9, are presented herein by way of illustration only. It would be highly preferable to provide many more than four processors in order to be able to compare sequences having a great deal more than just four elements. In fact, it will be seen hereinafter that the integrated circuit (IC) of the present invention provides sixteen such processors. In addition, the architecture of each such IC permits the serial interconnection of the sixteen processors on one chip with the sixteen processors on another chip, so that a large number of such processors can be tied together from chip to chip to provide a long sequence of interconnected processors. In the present invention, up to 512 such processors can be tied together to form a block and up to 8,192 such blocks or 4,194,304 such processors can be effectively interconnected without external software. The IC chip of the present invention, when operating in conjunction with other such chips, can compare sequences as long as 4,194,304 elements without the aid of external software.

Figure 10:
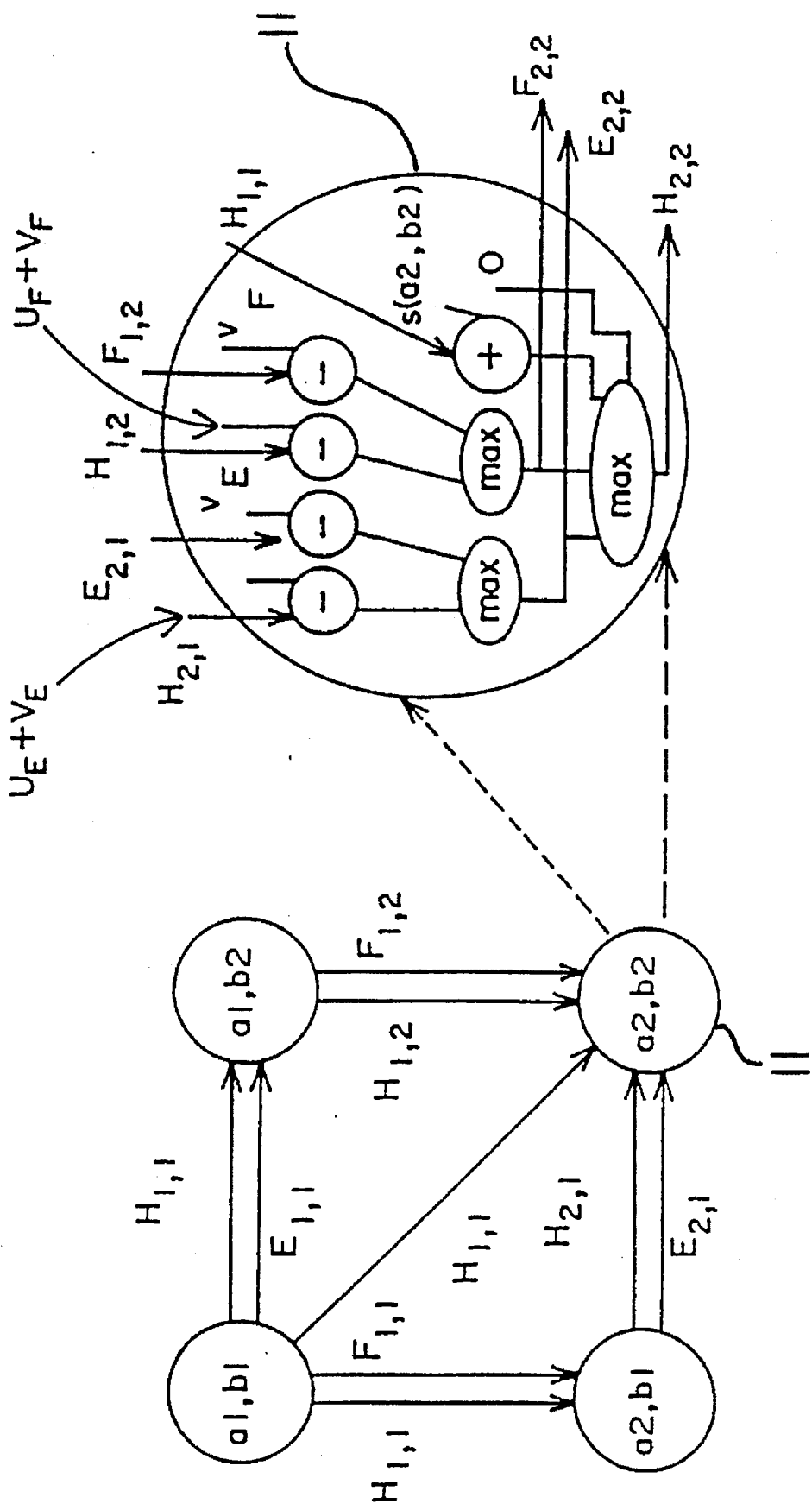
FIG. 10 is a graphical schematic illustration of the manner in which the architecture of a processor of the present invention performs the algorithmic steps for a particular matrix element.

The logical operations actually carried out by each element of the systolic processor array of FIGS. 2–9 may be better understood by reference to FIG. 10. In FIG. 10 the computations and parameter generation that occur within the $a_2,b_2$ processor 11 are shown by way of example. As seen in FIG. 10, in each such processor there are four subtractors, an adder and three calculators of maximums. The relevant equations are:

$$H_{1,1} = max\{0, H_{0,0} + s(a_1,b_1), E_{1,1}, F_{1,1}\}$$
$$E_{1,1} = max\{H_{1,0} - (u_E + v_E), E_{1,0} - v_E\}$$
$$F_{1,1} = max\{H_{0,1} - (u_F + v_F), F_{0,1} - v_F\}$$
$$H_{2,1} = max\{0, H_{1,0} + s(a_2,b_1), E_{2,1}, F_{2,1}\}$$
$$E_{2,1} = max\{H_{2,0} - (u_E + v_E), E_{2,0} - v_E\}$$
$$F_{2,1} = max\{H_{1,1} - (u_F + v_F), F_{1,1} - v_F\}$$

$$H_{1,2} = max\{0, H_{0,1} + s(a_1,b_2), E_{1,2}, F_{1,2}\}$$
$$E_{1,2} = max\{H_{1,1} - (u_E + v_E), E_{1,1} - v_E\}$$
$$F_{1,2} = max\{H_{0,2} - (u_F + v_F), F_{0,2} - v_F\}$$
$$H_{2,2} = max\{0, H_{1,1} + s(a_2,b_2), E_{2,2}, F_{2,2}\}$$
$$E_{2,2} = max\{H_{2,1} - (u_E + v_E), E_{2,1} - v_E\}$$
$$F_{2,2} = max\{H_{1,2} - (u_F + v_F), F_{1,2} - v_F\}$$

In accordance with these equations, the input parameters for the $a_2,b_2$ processor comprise: $H_{2,1}$, $E_{2,1}$, $H_{1,2}$, $F_{1,2}$ and $H_{1,1}$. The $H_{2,1}$ parameter is applied to a subtractor to which is also applied the value $U_E+V_E$, a constant which may be stored within the processor. The parameter $E_{2,1}$ is applied to a subtractor to which is also applied the constant value $V_E$. $H_{1,2}$ is applied to a subtractor to which is also applied the constant $U_F+V_F$ and the parameter $F_{1,2}$ is applied to a subtractor to which is also provided the value $V_F$. The parameter $H_{1,1}$ is applied to an adder to which is also supplied a similarity function of $a_2$ and $b_2$ which, as previously indicated, is a constant greater than zero if $a_2$ is equal to $b_2$ and a constant less than zero for $a_2$ not equal to $b_2$.

The output of the first two subtractors, that is the subtractors to which the parameters $H_{2,1}$ and $E_{2,1}$ are applied, respectively, are applied to a maximum value calculator. The output of this maximum value calculator is, by definition, $E_{2,2}$ and the outputs of the other subtractors are applied to a separate maximum value calculator, the output of which is by definition, the parameter $F_{2,2}$. $E_{2,2}$ and $F_{2,2}$ are applied to a third maximum value calculator to which is also applied the output of the adder and a zero signal. The output of this third maximum calculator is by definition $H_{2,2}$ which is the score of the alignment ending at $a_2,b_2$.

Figure 11:
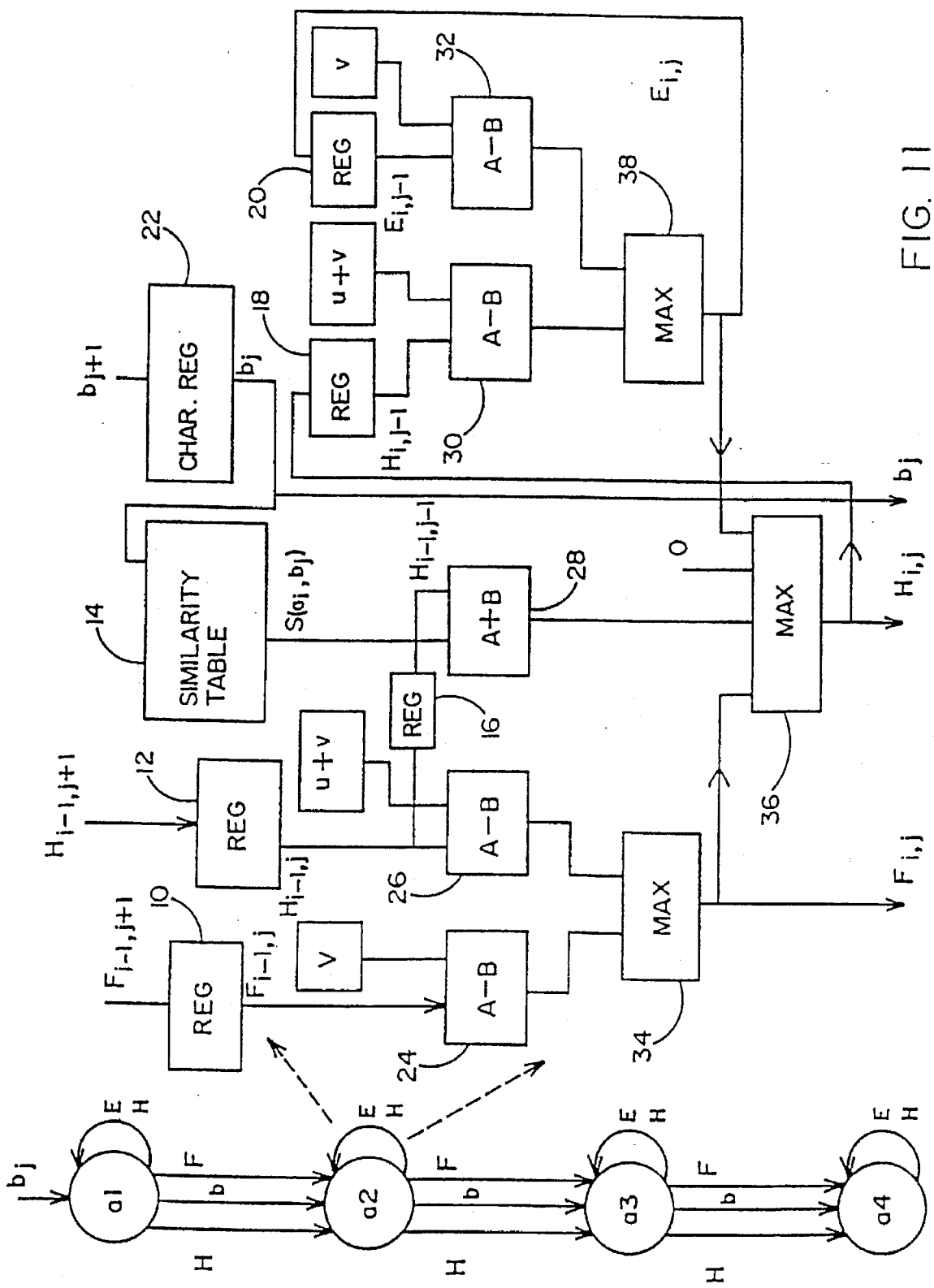
FIG. 11 is a generalized, functional block diagram of a processor of the present invention.

The functional block diagram of a processor of the present invention for performing the subtractions, additions and maximum calculator functions illustrated in FIG. 10, is shown in FIG. 11. As seen in FIG. 11 at the upper left hand corner thereof, the input parameters are $F_{i-1,j+1}$, $H_{i-1,j+1}$ and the sequence element $b_{j+1}$. As also seen in FIG. 11, there are a plurality of registers, namely a register into which the input parameters are stored for one clock cycle, as well as registers into which parameters generated within the processor of FIG. 11 are stored for one clock cycle. The purpose of these registers, as will be seen hereinafter, is to provide the necessary delays in signal transfer to the adder, subtractors and maximum calculators so that the processor carries out its algorithmic steps in the proper sequence and at the appropriate time and furthermore, so that the various algorithm parameters are available at the appropriate adder, subtractors and maximum calculators when the addition, subtractions and maximum calculations actually occur. More specifically, it will be seen hereinafter that each register of FIG. 11 imparts the appropriate amount of time delay in signal flow through the processor so that the input of any j parameter occurs simultaneously with the output of a j−1 parameter. Thus for example the $F_{i-1,j+1}$ parameter is input to a register 10 which, because of its predetermined delay, outputs simultaneously therewith, the parameter $F_{i-1,j}$. Similarly, the input to register 12, which is $H_{i-1,j+1}$ occurs substantially simultaneously with the output which is $H_{i-1,j}$. The output of registers 10 and 12 are applied to subtractors 24 and 26, respectively, to which are also supplied the constants, V and U+V, respectively. The output of register 12 is also applied to a register 16, the output of which is $H_{i-1,j-1}$, which is applied to an adder 28. Also applied to adder 28 is a signal indicative of the similarity or lack thereof between $a_i$ and $b_j$, referred to previously in the algorithm as the function $s(a_i,b_j)$. This similarity value is generated by a similarity table 14, based upon the $a_i$ stored therein and the $b_j$ input therein, from a character register 22, the input to which is $b_{j+1}$.

The output of subtractors 24 and 26 are both applied to a maximum calculator 34, the output of which by definition is $F_{i,j}$ which is an output signal of the processor of FIG. 11 for use in subsequent processor. The output of maximum calculator 34 is also applied to a maximum calculator 36. Other inputs to maximum calculator 36, include the output of the adder 28 and a zero signal. The output of maximum calculator 36 is by definition, the score value signal $H_{i,j}$ which constitutes the principal information desired from the comparison of two sequences ending at $a_i b_j$. The output of maximum calculator 36 is also applied to register 18, the output of which is thus $H_{i,j+1}$ which is, in turn, applied to the subtractor 30. Subtractor 30 also receives input U+V. The output of subtractor 30 is applied to maximum calculator 38, the output of which it will be seen hereinafter is $E_{i,j}$. Parameter $E_{i,j}$ is applied both to the maximum calculator 36 as an input thereto and also to register 20 in the right-most portion of FIG. 11, as an input to that register. The output of register 20 is thus $E_{i,j+1}$ which is applied to subtractor 32 to which a second input is the constant V. The output of subtractor 32 is also applied to maximum calculator 38 to produce the $E_{i,j}$ parameter.

Figure 12:
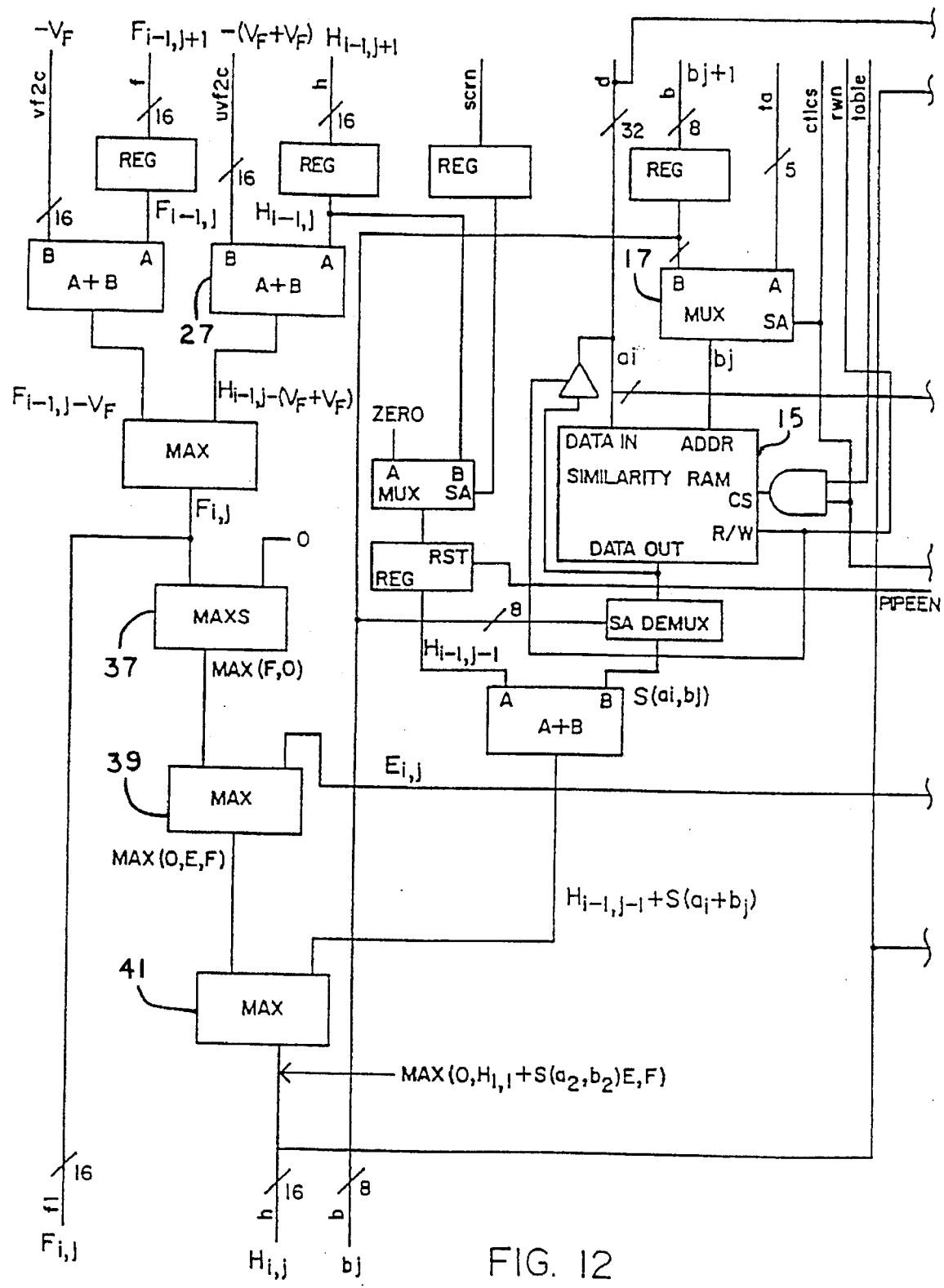
FIGS. 12 and 13, when taken together, represent a block diagram of an actual processor of the present invention.
Figure 13:
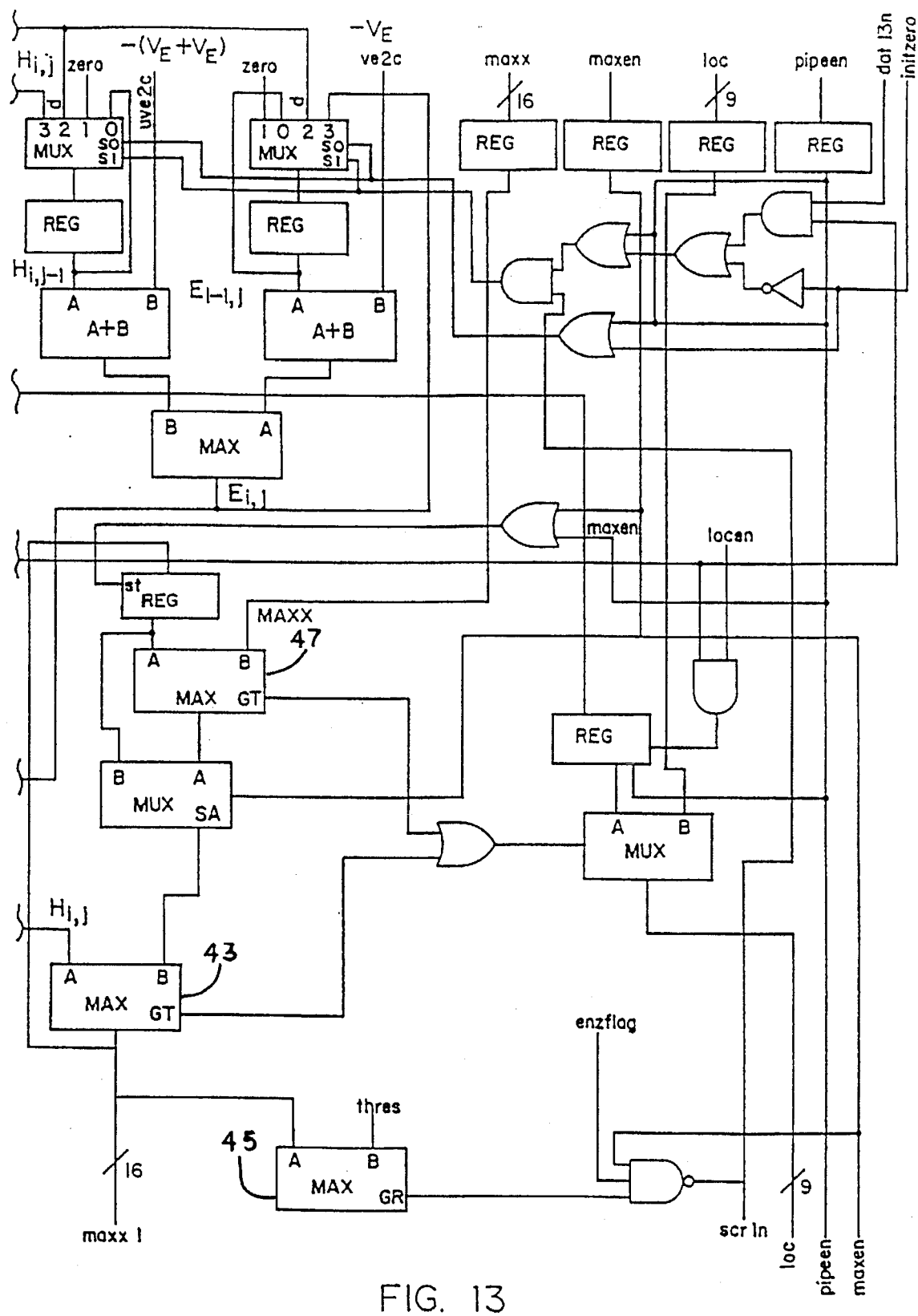

Thus it will be seen that the architecture depicted in FIG. 11 carries out the various computations of a single processor for comparing two elements of the sequence A and B in accordance with Waterman and Smith Algorithm, including providing the necessary time delay registers, subtractors, adder and maximum calculators to receive the appropriate parameters and to generate the parameters for the subsequent processor which, in turn, computes the same type of information for two sequence characters. It will be understood that the block diagram of FIG. 11 is of a functional nature only, to indicate the treatment of parameters that occur within one processor. However, the actual implementation of a processor is illustrated in FIGS. 12 and 13 taken in combination. Reference will now be made to FIGS. 12 and 13 for a more detailed understanding of the actual architecture of a processor of the present invention.

The principal differences between the functional block diagram of FIG. 11 and the actual block diagram of FIGS. 12 and 13 are the following: Subtractors 24 and 26 of FIG. 11 are actually adders 25 and 27 with one of the inputs inverted prior to application to the adder, so that the equivalent operation is a subtraction. Another distinction is that maximum calculators 36 and 38 only accept two values, consequently, there are more maximum calculators 37, 39 and 41 in the actual implementation of FIGS. 12 and 13 than there are in the functional block diagram of FIG. 11. Still another distinction between the functional block diagram and the actual block diagram of the processor of the present invention, is the fact that the latter must incorporate signals, which in addition to the parameter signal previously discussed in conjunction with FIG. 11, must be input and output to permit proper interface from processor to processor, as well as to facilitate appropriate timing of operation. In addition, there are at least two additional capabilities in the actual block diagram of FIGS. 12 and 13 as compared to the functional block diagram of FIG. 11. Specifically, in the actual block diagram, an additional maximum calculator 43 and 45 is provided which compares the value of $H_{i,j}$ to a preselected threshold value permitting the logic of the actual processor to ignore any scores which fall below the preset threshold value. In addition, the actual architecture of the processor of the present invention, provides an additional signal path through all processors in a block, as well as an additional maximum calculator 47 in each processor of a block, for comparing the maximum value of each processor with a maximum value of every other processor and propagating a signal which indicates when the maximum value of this particular processor is in fact the highest $H_{i,j}$ of all of the processors in the block.

Furthermore, it will be seen that in the block diagram of the actual processor of the present invention, the similarity table 14 of the functional block diagram of FIG. 11, comprises a random access memory 15 in which the data bus of the chip brings the character data into the similarity RAM, where it can be either written into the RAM or read out of the RAM and $b_j$ is applied to the addressed terminal of the RAM. In addition, the similarity RAM is provided with a chip select signal and a read/write signal as well as a data output which provides the similarity function output from a look-up table in the similarity RAM. A table address signal (TA) is also applied to the address terminal of the similarity RAM 15 through a multiplexer 17 as a high order five byte address for the similarity RAM table.

Other signals shown used in the block diagram of FIGS. 12 and 13 include location input and location output, which provide an indication of the location of the current maximum value in the block of processors. Maximum enable input and maximum enable output signals enable the comparison of the locally generated maximum value with the input maximum value in each processor. A pipeline enable signal is used and its state indicates when the $F_{i,j}$ and $H_{i,j}$ values are valid data so that these values can be saved. Synchronous clear signals are also input and output to each processor. The synchronous clear input resets the $H_{i,j}$ value so that the maximum value does not exceed the threshold value and the synchronous clear output, under certain conditions, namely when the maximum value generated is greater than the threshold value, sets the H value of the next processor to zero. However, it will be understood that except for the timing control and logic control, the use of threshold and maximum value transfer from processor to processor, the functional effect of the actual architecture depicted in FIGS. 12 and 13 is identical to that explained previously in conjunction with FIG. 11.

Figure 14:
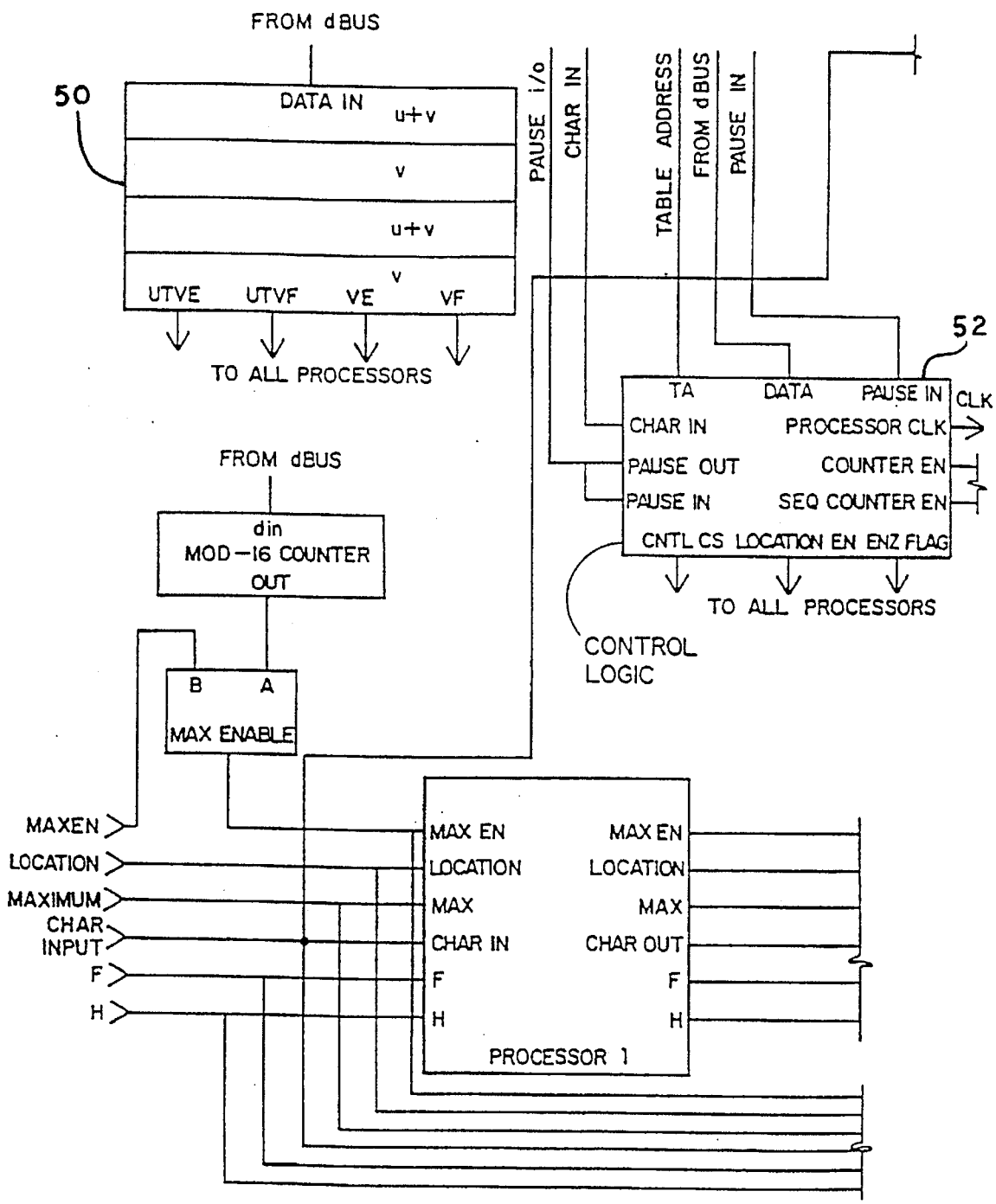
FIGS. 14 and 15, when taken together, constitute a schematic block diagram of the chip circuit of the present invention.
Figure 15:
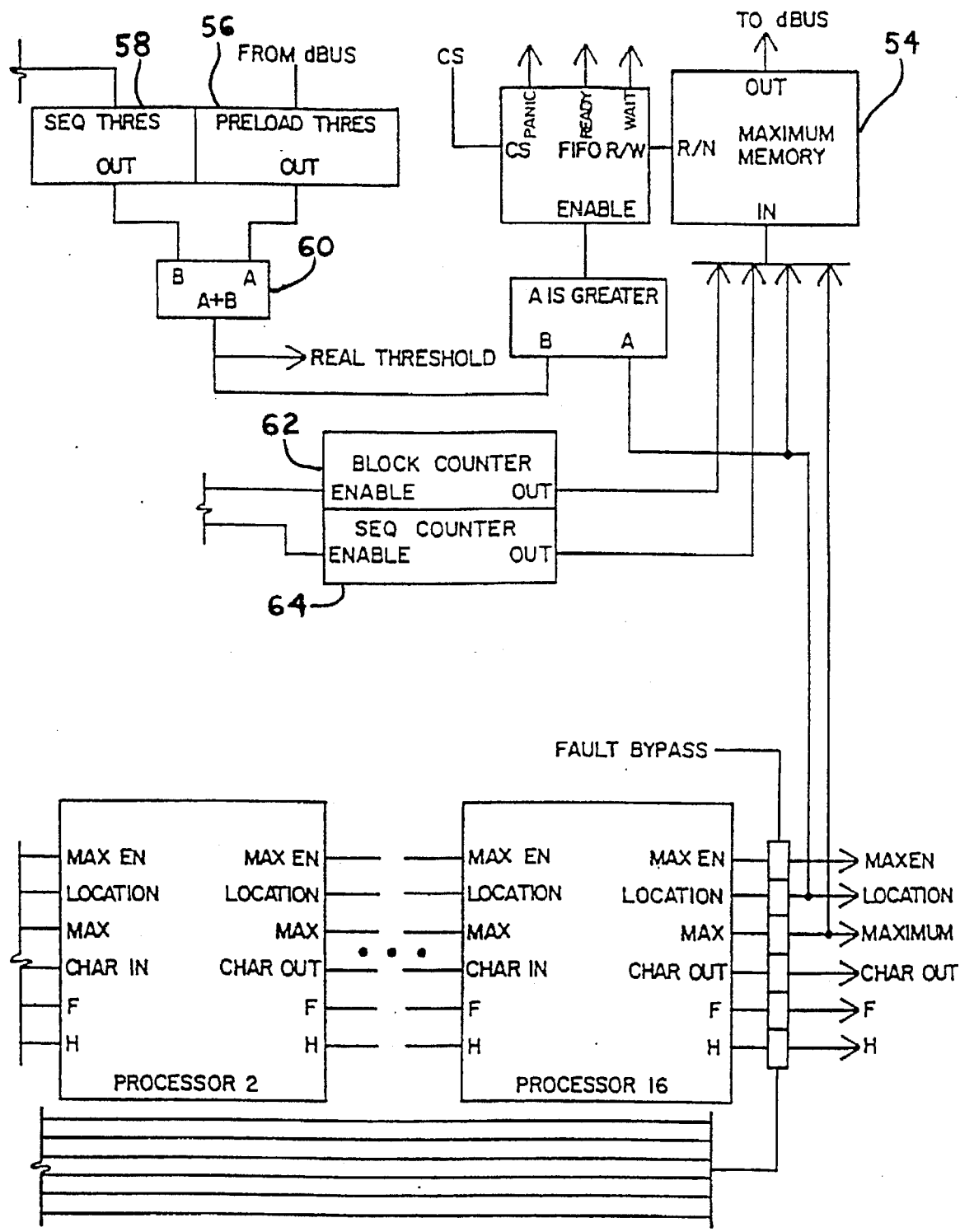

The manner in which the processors are integrated in a chip of the present invention and the other electronics associated with each circuit chip of the present invention will now be discussed in conjunction with FIGS. 14 and 15 which together comprise a functional block diagram of the biological information signal processor. Referring therefore now to FIGS. 14 and 15, it will be seen that each integrated circuit chip of the present invention comprises sixteen of the aforementioned processors connected in a serial array configuration in which a plurality of the aforementioned signals used within each processor, may be transferred from processor to processor on this particular chip, as well as to processors on other chips to which the present chip is connected. As previously indicated, without the aid of external software, up to 512 processors may be interconnected to form what is called a block and up to 8,192 such blocks may be interconnected without external software to handle one sequence.

All of the other elements of a signal processor of the present invention are designed to provide the requisite information, timing and signal flow input to and generated by the processors. Thus for example in the upper left-hand corner of FIG. 14, there is shown a plurality of registers 50 which are loaded from a data bus to provide the U+V and V constants which are needed in all of the processors and which represent various values of a linear function, representing scoring penalties for insertions and deletions in the Smith and Waterman Algorithm.

Figure 16:
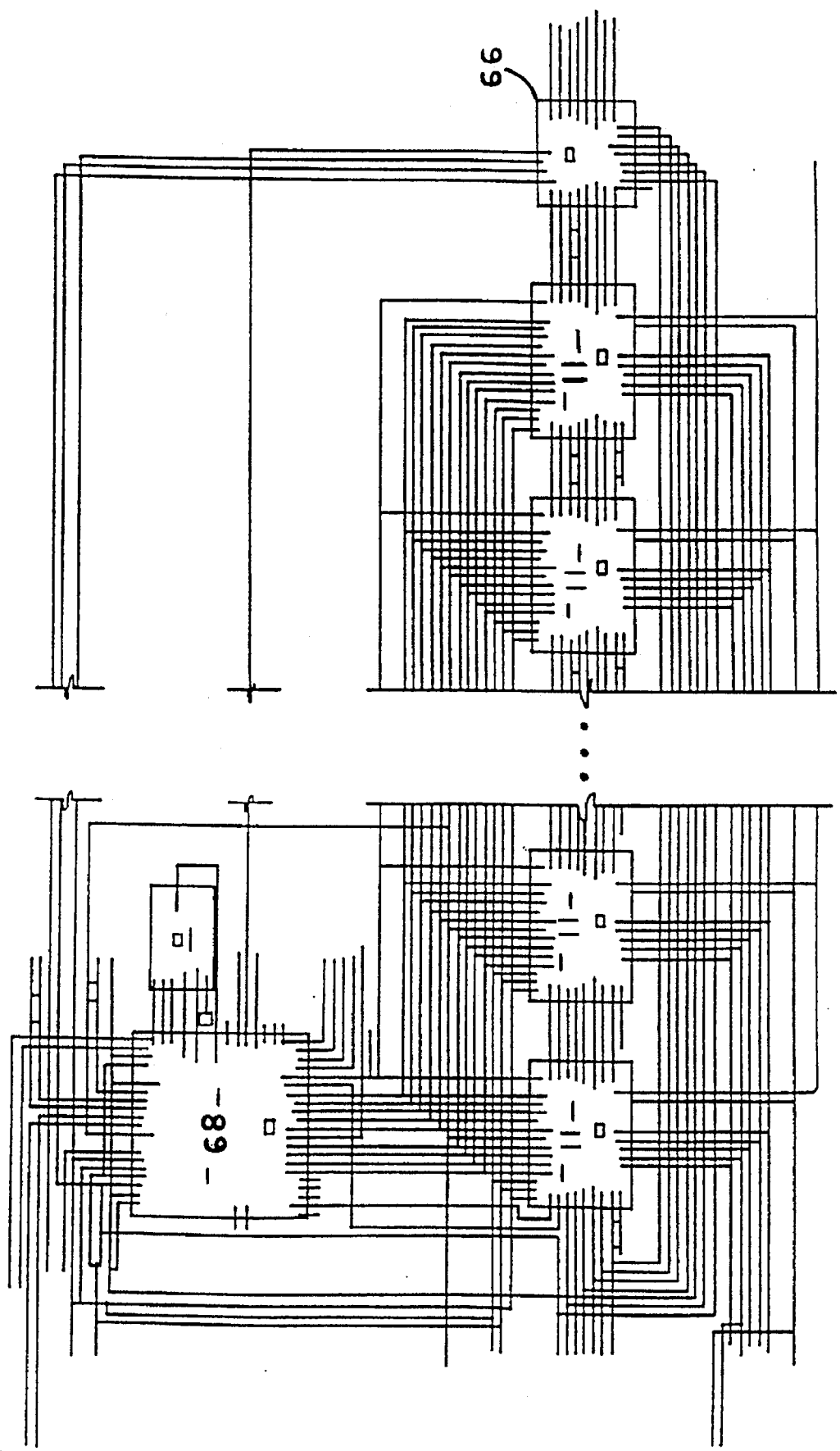
FIG. 16 is a layout schematic illustrating the physical configuration of the signal processing chip of the invention.

Also provided in the integrated circuit chip of the present invention is a control logic device 52 which controls the application of timing and logic signals to the processors, as well as signals which enable block and sequence counters, the outputs of which are stored in a maximum memory device 54 shown in the upper righthand corner of FIG. 15. The control logic also controls pause input and output signals which are used under certain conditions for temporarily halting the operation of the processors, such as when maximum memory is filled. The processor of the present invention also provides means for loading a threshold into the chip and for utilizing this threshold for enabling storage of maximums into memory only when the threshold is exceeded. The threshold registers are shown in the upper left-hand corner of FIG. 15. There is a preload threshold register 56 which receives its input from the data bus and a sequence threshold register 58 which receives its input from the character port when the chip is to be loaded with a query sequence threshold. Also provided is an adder 60 which adds the sequence threshold and the preload threshold to provide what is referred to as a real threshold against which the scores of the respective processors are compared in a threshold comparator. A pair of counters is also provided, namely a block counter 62 and a sequence counter 64. These counters enable the maximum memory to correlate the maximum score value with the sequence and the user defined block. A physical representation of the layout of the integrated circuit chip of the present invention is shown in FIG. 16.

The sixteen processors 11 are arranged in a serial array terminating in a pipeline register 66. The device in the upper left-hand corner of FIG. 16 is a control block 68 which comprises the control logic 52, counters 62 and 64 and registers 50, 56 and 58 previously described in conjunction with FIGS. 14 and 15.

Figure 17:
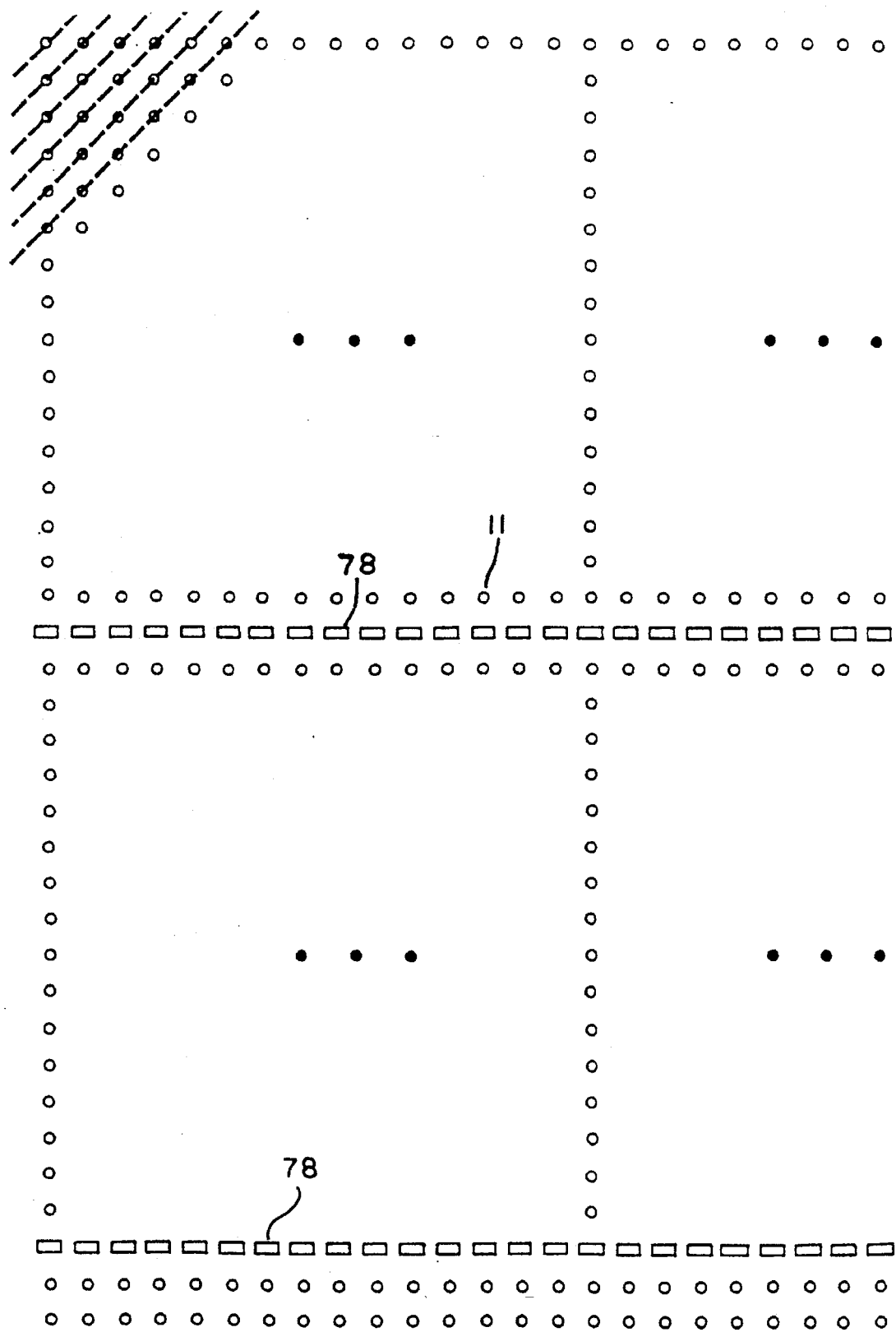
FIGS. 17 and 18 taken together provide a dependence graph mapping for multiple chips representing a total of 34 processors of the present invention.
Figure 18:
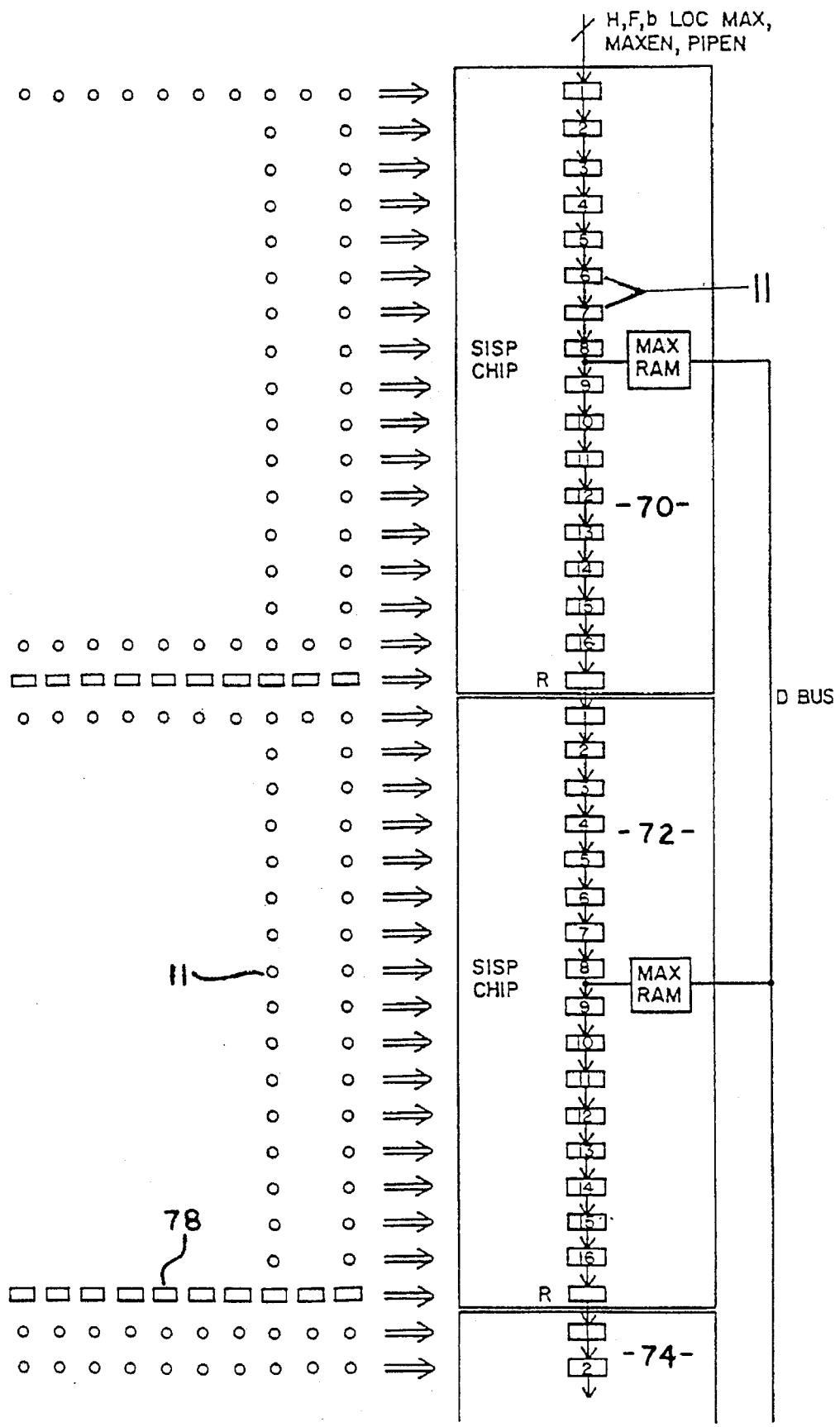

The interface between integrated circuit chips of the present invention may be best understood by referring to FIGS. 17 and 18 which provide an exemplary dependence graph for 34 processors 11 on three separate chips 70, 72 and 74, the latter being shown on the right side of FIG. 18. Each chip provides 16 processors 11 and a pipeline register 76. In the dependence graph the pipeline registers are shown as rectangles 78 which merely delay the operation between the last processor of one chip and the first processor of the next chip.

The dependence graph of FIGS. 17 and 18 is generally a larger matrix version of the graphs of FIGS. 1–9, except that it includes a sufficient number of processors 11 to demonstrate the "block edge" behavior based upon a minimum block size of 16 elements. This "block edge" behavior is designed to prevent maximum score buffer overflow by resetting "H" values in the $a_{16}$, $b_{16}$ processor, the $a_{32}$, $b_{32}$ processor, etc. Only the "H" values which exceed the previously noted threshold and which are output in the horizontal and diagonal directions to the adjacent processors are reset.

This "block edge" resetting procedure constitutes a modification to the Smith and Waterman algorithm which is unique to the present invention. It is implemented in each chip by means of a boundary set zero enable signal (ENZ flag) in the control logic of FIG. 14. If this bit is set and the output H value is greater than the threshold value, then the SISP chip will reset the internally fedback E value and the $H_{i-1,j-1}$ value of the next SISP chip.

It will now be understood that what has been disclosed herein comprises a sequence information signal processing integrated circuit chip designed to perform high speed calculation based upon the dynamic programming algorithm defined by Waterman and Smith. This chip is designed to be a building block of a linear systolic array. The performance of the systolic array can be increased by connecting additional such chips to the array. Each such chip provides sixteen processor elements, a 128 word similarity table in each processor element, user definable query threshold and preload threshold and block maximum value and location calculation and buffering. The chip provides the equivalent of about 400,000 transistors or 100,000 gates. All numerical data are input in 16 bit, two's compliment format, and result in comparison scores ranging from +32,767 to −32,768. A control logic device in the chip performs the control and sequencing of the processor elements. It contains threshold logic for sequence and timing, as well as enabling counters for sequence and block counts.

Those having ordinary skill in the arts relevant to the present invention will now, as a result of applicants' teaching herein, perceive various modifications and additions which may be made to the invention. By way of example, the particular algorithm as well as the architecture designed to perform the algorithm processes, may be altered while still providing a useful and accurate measure of the hornology of two or more data sequences or subsequences thereof. Accordingly, all such modifications or additions are deemed to be within the scope of the invention which is to be limited only by the claims appended hereto.

We claim:

1. A computational apparatus for dynamically comparing against one another a first element sequence having a first number of elements and a second element sequence having a second number of elements by providing a plurality of scores indicative of the degree of similarity of respective segments of the sequences; the apparatus comprising:

a plurality of processors segregated into distinct groups of processors, each such processor having means for generating respective ones of said scores for said segments ending at selected elements of said respective sequences, said means for generating said scores including means for processing responsive to insertion of an additional element into one of said sequences during said dynamic comparison a signal indicative of said additional element insertion;

means for determining the maximum one of said processor-generated scores and the ending elements of segments at which such maximum score occurs; and means in each of said groups for establishing a threshold score and for ignoring all said scores below said threshold score, the threshold score in each said group being independently selected from the threshold score in all of the remaining groups.

2. The apparatus recited in claim 1 further comprising means for basing said scores on similarity measures of said ending elements, each said processor having a selected similarity measure associated with it.

3. The apparatus recited in claim 2 wherein said basing means permits independently controllable similarity measures in said respective processors.

4. The apparatus recited in claim 1 further comprising means for basing said scores on whether or not said respective segments differ from one another as a result of one or more deletions and insertions in said segments, wherein said basing is a function of the occurrence and length of such deletions and insertions.

5. The apparatus recited in claim 4 wherein said basing means permits differences in score effects between deletions and insertions in one segment and deletions and insertions in the other second segment.

6. The apparatus recited in claim 1 further comprising means controlling said processors for simultaneous generation of said scores in said plurality of processors, each of said simultaneously-generated scores being for segments ending at different ones of said selected elements.

7. The apparatus recited in claim 1 wherein said processors are arranged in a linear systolic array.

8. The apparatus recited in claim 7 further comprising means wherein each processor during sequence comparing, is associated with a respective element $a_i$ of sequence A and generates a score for each respective element $b_j$ of sequence B.

9. The apparatus recited in claim 7 further comprising means for interconnecting said array of processors to additional arrays of processors.

10. The apparatus recited in claim 1 wherein each said group of processors.

11. The apparatus recited in claim 1 further comprising memory means for storing said maximum scores.

12. The apparatus recited in claim 1 further comprising clock means for synchronizing said processors.

13. An apparatus of the type having a plurality of VLSI circuit devices for receiving signals representative of at least two data sequences A and B, where $A=a_1, a_2 \ldots a_n$, $B=b_1, b_2 \ldots b_m$, and for dynamically comparing sequences A and B by generating score signals representative of the degree to which segments of A and B are similar; each such device comprising:

a plurality of processors, each such processor having means for periodically generating respective ones of said scores for said segments ending at selected elements of said respective sequences, said means for periodically generating said scores including means for processing responsive to insertion of an additional element into one of said sequences during said dynamic comparison a signal indicative of said additional element insertion; and means for determining the maximum one of said processor-generated scores and the ending elements of segments at which such maximum score occurs;

each said device having a distinct selected score threshold which can be different from the score thresholds in the remaining devices.

14. The apparatus recited in claim 13, each said device further comprising means for establishing said threshold score and for ignoring all said scores below said threshold score.

15. The apparatus recited in claim 13, each said device further comprising means for basing said scores on similarity measures of said ending elements, each said device having independent basing means associated with each said processor.

16. The apparatus recited in claim 15 wherein said basing means permits independently controllable similarity measures in said respective processors.

17. The apparatus recited in claim 13 further comprising means for basing said scores on whether or not said respective segments differ from one another as a result of one or more deletions and insertions in said segments, wherein said basing is a function of the occurrence and length of such deletions and insertions.

18. The apparatus recited in claim 17 wherein said basing means permits differences in score effects between deletions and insertions in one segment and deletions and insertions in the other second segment.

19. The apparatus recited in claim 13 further comprising means controlling said processors for simultaneous generation of said scores in said plurality of processors, each of said simultaneously-generated scores being for segments ending at different ones of said selected elements.

20. The apparatus recited in claim 13 wherein said processors are arranged in a linear systolic array.

21. The apparatus recited in claim 20 further comprising means wherein each processor during sequence comparing, is associated with a respective element $a_i$ of sequence A and generates a score for each respective element $b_j$ of sequence B.

22. The apparatus recited in claim 21 further comprising means for interconnecting said array of processors to additional arrays of processors.

23. The apparatus recited in claim 13 further comprising memory means for storing said maximum score.

24. The apparatus recited in claim 13 further comprising clock means for synchronizing said processors.

25. An integrated circuit apparatus for dynamically comparing against one another a first element sequence having a first number of elements and a second element sequence having a second number of elements by providing a plurality of scores indicative of the degree of similarity of the sequences; the apparatus comprising:

a plurality of processors, each such processor having means for generating respective ones of said scores for segments ending at selected elements of said respective sequences, said means for generating said scores including means for processing responsive to insertion of an additional element into one of said sequences during said dynamic comparison a signal indicative of said additional element insertion;

means for determining the maximum one of said processor-generated scores and the ending elements at which such maximum score occurs;

each said processor having a similarity measuring memory which is independent of the similarity measuring memories of all of the remaining processors whereby each processor contributes to said maximum score determining means using an independent measure of similarity.

26. The apparatus recited in claim 25 further comprising means for establishing a threshold score and for ignoring all said scores below said threshold score.

27. The apparatus recited in claim 25 further comprising means for basing said scores on whether or not said respective sequences differ from one another as a result of one or more deletions and insertions in said sequences, wherein said basing is a function of the occurrence and length of such deletions and insertions.

28. The apparatus recited in claim 27 wherein said basing means permits differences in score effects between deletions and insertions in one sequence and deletions and insertions in the other sequence.

29. The apparatus recited in claim 25 further comprising means controlling said processors for simultaneous generation of said scores in said plurality of processors, each of said simultaneously-generated scores being for segments ending at different ones of said selected elements.

30. The apparatus recited in claim 25 wherein said processors are arranged in a linear systolic array.

31. The apparatus recited in claim 30 further comprising means wherein each processor during sequence comparing, is associated with a respective element $a_i$ of sequence A and generates a score for each respective element $b_j$ of sequence B.

32. The apparatus recited in claim 25 wherein said processors and said determining means are all located on a unitary integrated circuit device.

33. The apparatus recited in claim 30 further comprising means for interconnecting said array of processors to additional arrays of processors.

34. The apparatus recited in claim 25 further comprising memory means for storing said maximum score.

35. The apparatus recited in claim 25 further comprising clock means for synchronizing said processors.

36. An electronic system for the dynamic comparison of a first sequence having a first number of character elements with a second sequence having a second number of character elements, the system comprising:

a plurality of data processors arranged in a series with each data processor being coupled to the next subsequent data processor in said series;

means for storing representations of said first sequence of character elements in said series of data processors, with each character element being associated with a respective one of said data processors, a series of discrete independently variable digital similarity tables stored in a memory device associated respectively with each data processor and character elements included in said first sequence of character elements;

said series of data processors including shift registers for storing representations of said second sequence of character elements, with one of said second sequence of character elements being associated with each data processor, and means for stepping said representations of said second sequence of character elements along said shift register, from one data processor to the next, along said series of data processors;

the similarity tables stored in said data processors providing digital values for each pattern of representations of said second series of character elements in said shift registers; and means for determining the level of correspondence between said first and second sequence of character elements from said digital values, whereby each said data processor can contribute to said level of correspondence based upon a unique similarity table stored in a corresponding memory device, said means for determining the level of correspondence between said first and second sequences including means for processing responsive to insertion of an additional element into one of said first and second sequences during said dynamic comparison a signal indicative of said additional element insertion.

37. The system recited in claim 36 further comprising a clock for synchronizing the operation of said data processor.

38. The system recited in claim 36 further comprising means for manifesting said level of correspondence as scores corresponding to each pair of characters of said first and second sequences.

39. The system recited in claim 38 further comprising means for determining the maximum such score and for identifying the pair of characters corresponding to said maximum score.

40. A multiprocessor apparatus for dynamically comparing against one another a first sequence having a first number of elements and a second sequence having a second number of elements comprising:

a plurality of computational processors arranged in an interconnected serial array; each such processor being selectively associated with an element of said first sequence of elements;

means for serially propagating said second sequence of elements through said processors; and means for generating a measure of the similarity of said sequences and alternatively for element segments thereof at each processor for each processor's combination of elements from said first and second sequences substantially as said second sequence elements are propagated through said processors, said means for generating said measure of similarity including means for processing responsive to insertion of an additional element into one of said sequences during said dynamic comparison a signal indicative of said additional element insertion;

means for identifying the respective elements of said first and second sequences for which said measure represents the greatest degree of such similarity;

means for establishing a threshold measure and for ignoring all said measures below said threshold measure;

means for storing all said measures above said threshold measure and for automatically stopping said propagating of said second sequence of elements through said processors when a selected number of said measures are stored.

41. The apparatus recited in claim 40 further comprising means for basing said measure on similarity measures of each processor's elements.

42. The apparatus recited in claim 40 further comprising means for basing said measures on whether or not said respective segments differ from one another as a result of one or more deletions in said segments.

43. The apparatus recited in claim 42 wherein said basing means permits differences in score effects between deletions in one segment and deletions in the other second segment.

44. The apparatus recited in claim 40 wherein all of said processors, said propagating means and said generating means are located on a unitary integrated circuit device.

45. The apparatus recited in claim 40 further comprising means for interconnecting said array of processors to additional arrays of processors.

46. The apparatus recited in claim 40 further comprising clock means for synchronizing said processors.

47. An integrated circuit apparatus for dynamically comparing at least one element sequence against a plurality of other element sequences by providing a plurality of scores indicative of the degree of similarity of respective segments of the one element sequence and the other element sequence; the apparatus comprising:

a plurality of processors, each such processor having means for generating respective ones of said scores for said segments ending at selected elements of said respective sequences, said means for generating said scores including means for processing responsive to insertion of an additional element into one of said sequences during said dynamic comparison a signal indicative of said additional element insertion; and means for determining the maximum ones of said processor generated scores for each of said other element sequences and the ending elements of segments at which such maximum scores occur;

each said processor comprising a memory device for storing a similarity table upon which each said score is based, each such table being independently variable from all other such tables.

48. A sequence information signal processing apparatus for dynamically comparing against one another a first sequence having a first number of elements and a second sequence having a second number of elements comprising a plurality of computational processors arranged in an interconnected serial array; each such processor being selectively associated with an element of said first sequence of elements;

means for serially propagating said second sequence of elements through said processors; and means for generating a measure of similarity of said sequences and for identifying the respective elements of said sequences for which a maximum measure of similarity occurs, said means for generating said measure of similarity including means for processing responsive to insertion of an additional element into one of said sequences during said dynamic comparison a signal indicative of said additional element insertion;

wherein said processors are arranged in discrete, serially interconnected blocks of processors and wherein said apparatus further comprises means for providing one such maximum measure in each said block, means for comparing the maximum measures of all such blocks and means for automatically resetting the maximum measure in each said block to zero before such maximum measure is compared with the maximum measure of a subsequent block when said maximum measure exceeds a selected measure.

* * * * *